(12) United States Patent
Sugiura et al.

(10) Patent No.: US 7,957,058 B2
(45) Date of Patent: Jun. 7, 2011

(54) MICROSCOPE

(75) Inventors: Tadao Sugiura, Hirakata (JP);
Katsuhiko Yasaka, Ibargi (JP); Takashi Kawahito, Fujsawa (JP); Kumiko Matsui, Yokohama (JP)

(73) Assignees: National University Corporation Nara Institute of Science and Technology, Nara (JP); Nikon Corporation, Tokyo (JP)

( * ) Notice: Subject to any disclaimer, the term of this patent is extended or adjusted under 35 U.S.C. 154(b) by 579 days.

(21) Appl. No.: 11/993,020

(22) PCT Filed: Jun. 30, 2006

(86) PCT No.: PCT/JP2006/313522
§ 371 (c)(1),
(2), (4) Date: Dec. 18, 2007

(87) PCT Pub. No.: WO2007/004708
PCT Pub. Date: Jan. 11, 2007

(65) Prior Publication Data
US 2010/0142038 A1    Jun. 10, 2010

(30) Foreign Application Priority Data

Jun. 30, 2005 (JP) .................................. 2005-192572
Mar. 20, 2006 (JP) .................................. 2006-077067

(51) Int. Cl.
*G02B 21/06* (2006.01)
*G02B 21/00* (2006.01)

(52) U.S. Cl. ........................................ 359/385; 359/368

(58) Field of Classification Search .......... 359/368–390, 359/738–740
See application file for complete search history.

(56) References Cited

U.S. PATENT DOCUMENTS

| | | | | |
|---|---|---|---|---|
| 4,407,569 A | * | 10/1983 | Piller et al. | ..................... 359/370 |
| 2003/0058530 A1 | | 3/2003 | Kawano | |
| 2003/0081201 A1 | | 5/2003 | Shibata et al. | |
| 2004/0246573 A1 | | 12/2004 | Tsuchiya et al. | |

FOREIGN PATENT DOCUMENTS

| | | | | |
|---|---|---|---|---|
| JP | 05-296842 A | | 11/1993 | |
| JP | 06-160723 A | | 6/1994 | |
| JP | 09-15507 A | | 1/1997 | |
| JP | 11-352408 A | | 12/1999 | |
| JP | 2003-083886 A | | 3/2003 | |
| JP | 2003-98439 A | | 4/2003 | |
| JP | 2003-114388 | * | 4/2003 | ..................... 359/385 |
| JP | 2003-130808 A | | 5/2003 | |
| JP | 2004-151445 A | | 5/2004 | |
| JP | 2004-302421 | * | 10/2004 | ..................... 359/385 |
| JP | 2004-347777 A | | 12/2004 | |

* cited by examiner

*Primary Examiner* — Thong Nguyen
(74) *Attorney, Agent, or Firm* — Miles & Stockbridge, P.C.

(57) ABSTRACT

A microscope for introducing light from a light source via an objective lens to a sample so that a user observes the sample via the objective lens includes: a minute opening arranged in an optical path between the light source and the objective lens and on a focal plane of the image side of the objective lens or at a position conjugate with its conjugate plane; position adjusting means for adjusting the position of the minute opening so that the light from the light source via the minute opening is incident to the sample at the Brewster's angle; an polarizing element arranged in the optical path between the light source and the objective lens for extracting rectilinear polarized light from the light from the light source and applying the rectilinear polarized light to the sample.

8 Claims, 16 Drawing Sheets

MICROSCOPE

TECHNICAL FIELD

The present invention relates to a microscope.

BACKGROUND ARTS

Brewster Microscope

It has been well known since 19th century that reflectance of p-polarized light becomes zero when the incident angle becomes Brewster angle. Dirk Honig and Dietmar Mobius, and S. Henon and J. Meunier reported in 1991 that observation of a monolayer could be performed by using this phenomenon. Since then, research on imaging reflectance distribution of a thin film has become active.

The phenomenon has been used mainly for structural observation of a monolayer such as two-dimensional structure of a Langmuir monolayer spread at a gas-liquid interface on a liquid, phase separation of a mixed Langmuir monolayer, and Langmuir-Blodgett film formed on a substrate. An imaging apparatus thereof is now put on the market, and used for evaluating a thin film in a semiconductor manufacturing process, and for product inspection of a DNA micro-array used in a DNA examination.

In such method, an observation is made by the following configuration that a laser beam is tilted with respect to the interface until the incident angle becomes Brewster angle, and the light reflected from the interface forms an image by an imaging lens disposed in the direction of regular reflection (for example, see Altech Co., Ltd. "BMA Brewster Angle Microscope", the Internet <URL:http://www.ksv.jp/bam_01.html>). With this configuration, since the observation lens is tilted with respect to the thin film sample, the area to be observed at a time is limited to a slit shape. Accordingly, in such apparatus, the whole image is obtained by linearly scanning the position of illumination on the sample.

<Surface Plasmon Microscope>

Surface plasmons, which are collective longitudinal wave oscillation of free electrons located in the vicinity of a metal surface, can be excited by visible light and is experimentally verified by Otto and Kretschmann to be used for detecting molecules in the vicinity of a metal thin film.

Surface plasmon resonance is a resonance phenomenon between incident light and surface plasmons (surface plasmon polaritons), and is a resonance phenomenon that is generated by propagating the incident light and surface plasmons with the same velocity with longitudinal wave oscillation when a wave number vector in the direction of the metal surface of the incident light is coincide with a wave number of surface plasmons.

Since the wave number of surface plasmons on the surface of a metal is larger than that of the light propagating in the medium, in order to generate surface plasmon resonance, it is necessary that the light becomes evanescent field on the metal surface. Accordingly, the light is incident on the rear surface of the substrate, whose upper surface is formed with a metal film, with an incident angle larger than the critical angle (Kretschmann configuration), and fine adjustments are performed upon generating evanescent field on the metal surface, so that surface plasmon resonance can be generated. Upon generation of surface plasmon resonance, since energy of incident light is lost in the metal film as Joule loss, intensity of reflection light is drastically reduced. Accordingly, by measuring reflectance with varying the angle of incidence, surface plasmon resonance can be observed (surface plasmon spectroscopy).

Since wave number of surface plasmon is highly depended upon dielectric constant and thickness of the medium with which surface plasmon makes contact, by observing surface plasmon resonance phenomenon (surface plasmon spectroscopy), it becomes possible to obtain information regarding dielectric constant and thickness of the medium. Accordingly, surface plasmon resonance is used for measuring adsorption phenomenon of a substance to the metal film, and for measuring mutual interaction of protein.

Moreover, by measuring reflectance of each point of the metal surface on the basis of the principle, an attempt to imaging molecular distribution in the vicinity of the metal thin film was tried for the first time in 1988 by W. Hickel and W. Knoll (surface plasmon microscope). After that, high-resolution observation of a molecular lipid membrane formed on a metal film, real time observation of DNA hybridization, measurement of mutual interaction between DNA and protein, and the like are carried out.

However, in the above-mentioned Brewster microscope and surface plasmon microscope, since a sample has to be illuminated with a large angle of incidence such as Brewster angle or an angle to generate surface plasmon resonance, interference fringes are produced at a portion where configuration or refractive index of the sample is remarkably changed. Moreover, since the background of the sample image is nearly total darkness and S/B ratio (signal/background ratio) is high, even slight interference fringes tend to be extremely conspicuous.

DISCLOSURE OF THE INVENTION

According to a first aspect of the present invention, there is provided a microscope that illuminates a sample with light from a light source through an objective lens and makes it possible to observe the sample through the objective lens, the microscope including, a minute aperture that is disposed in an optical path between the light source and the objective lens and disposed at a position of an image side focal plane of the objective lens or a position conjugate therewith, a position adjustment member that adjusts the position of the minute aperture so as to make light from the light source incident on the sample with the Brewster angle through the minute aperture, and a polarizer that is disposed in the optical path between the light source and the objective lens, produces linearly polarized light, and illuminates the sample with the linearly polarized light.

According to a second aspect of the present invention, there is provided a microscope that illuminates a sample with laser light from a laser light source through an objective lens and makes it possible to observe the sample through the objective lens, the microscope including, a polarizer that is disposed on an optical path between the laser light source and the objective lens and produces linearly polarized light, wherein the laser light source is disposed such that a converging point of the laser light is disposed at a position conjugate with a pupil of the objective lens, and the laser light is positioned where laser light is incident on the sample with a Brewster angle.

According to a third aspect of the present invention, there is provided a microscope that illuminates a sample with light from a light source through an objective lens and makes it possible to observe the sample through the objective lens, the microscope including, a minute, arc-shaped aperture that is disposed in an optical path between the light source and the objective lens in the vicinity of an image side focal plane of the objective lens or a conjugate plane thereof, and makes the light from the light source incident on the sample with substantially Brewster angle, and a polarizer that is disposed in the optical path between the light source and the objective lens and provides linearly polarized light from light from the light source, wherein the minute, arc-shaped aperture satisfies the following conditional expressions:

$$\delta r \leq 0.06 \times f$$

$$\phi \leq 20°$$

where δr denotes a radial width of the minute, arc-shaped aperture, f denotes a focal length of the objective lens, and φ denotes a central angle of the minute, arc-shaped aperture.

THE BEST MODE FOR CARRYING OUT THE INVENTION

An inverted microscope according to each embodiment according to the present invention is explained below with reference to accompanying drawings.

First Embodiment

Figure 1:
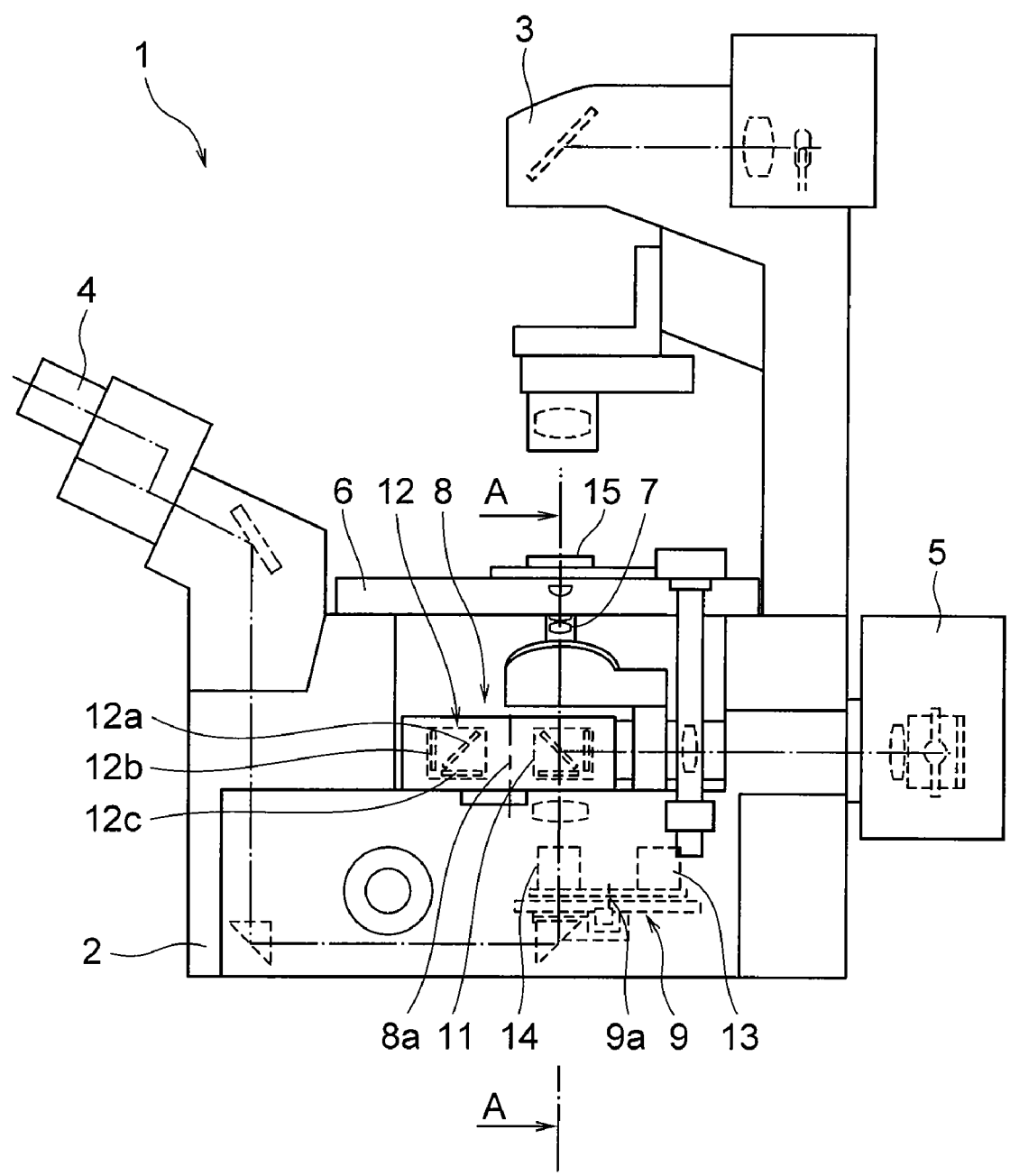
FIG. 1 is a side view showing a configuration of an inverted microscope according to a first embodiment of the present invention.
Figure 2:
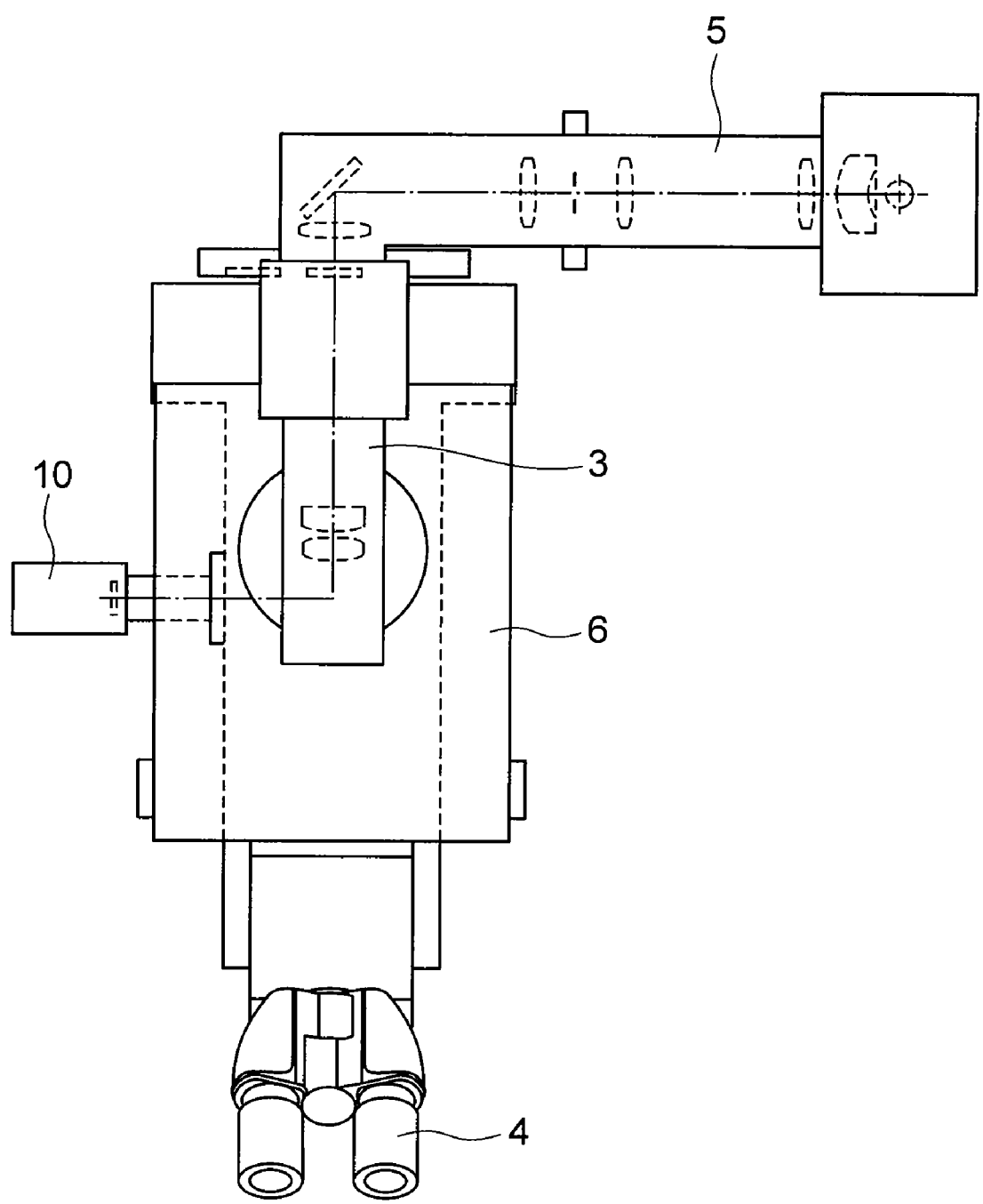
FIG. 2 is a top view showing the configuration of the inverted microscope according to the first embodiment of the present invention.

FIGS. 1 and 2 views showing a configuration of an inverted microscope according to a first embodiment in which FIG. 1 is a side view and FIG. 2 is a top view.

As shown in FIG. 1, the inverted microscope 1 according to the first embodiment is composed of a microscope base 2, a diascopic illumination device 3 disposed upper side of the microscope base 2, an eyepiece tube 4, and an episcopic illumination device 5 disposed on a side of the microscope base 2.

On top of the microscope base 2, there is disposed a stage 6 on which a sample is placed. In the microscope base 2, there are disposed, in order from the stage 6 downward, an immersion objective 7 with a high numerical aperture, a block exchange unit 8, and an optical path exchange unit 9. As shown in FIG. 2, there is disposed a CCD camera 10 on the other side of the microscope base 2 shown in FIG. 1.

The block exchange unit 8 is equipped with a beam splitter 11 and a fluorescence filter block 12, and is able to selectively dispose them into the optical path by rotating around an axis 8a. The fluorescence filter block 12 is composed of a dichroic mirror 12a, an excitation filter 12b, and an absorption filter 12c, and used upon fluorescence observation.

The optical path exchange unit 9 is equipped with a semitransparent prism 13 and a total reflection prism 14, and is able to selectively dispose them into the optical path by rotating around an axis 9a. Accordingly, it becomes possible to selectively lead the image of the sample 15 into the CCD camera 10 and the eyepiece tube 4, or into the CCD camera 10 only.

Figure 3A:
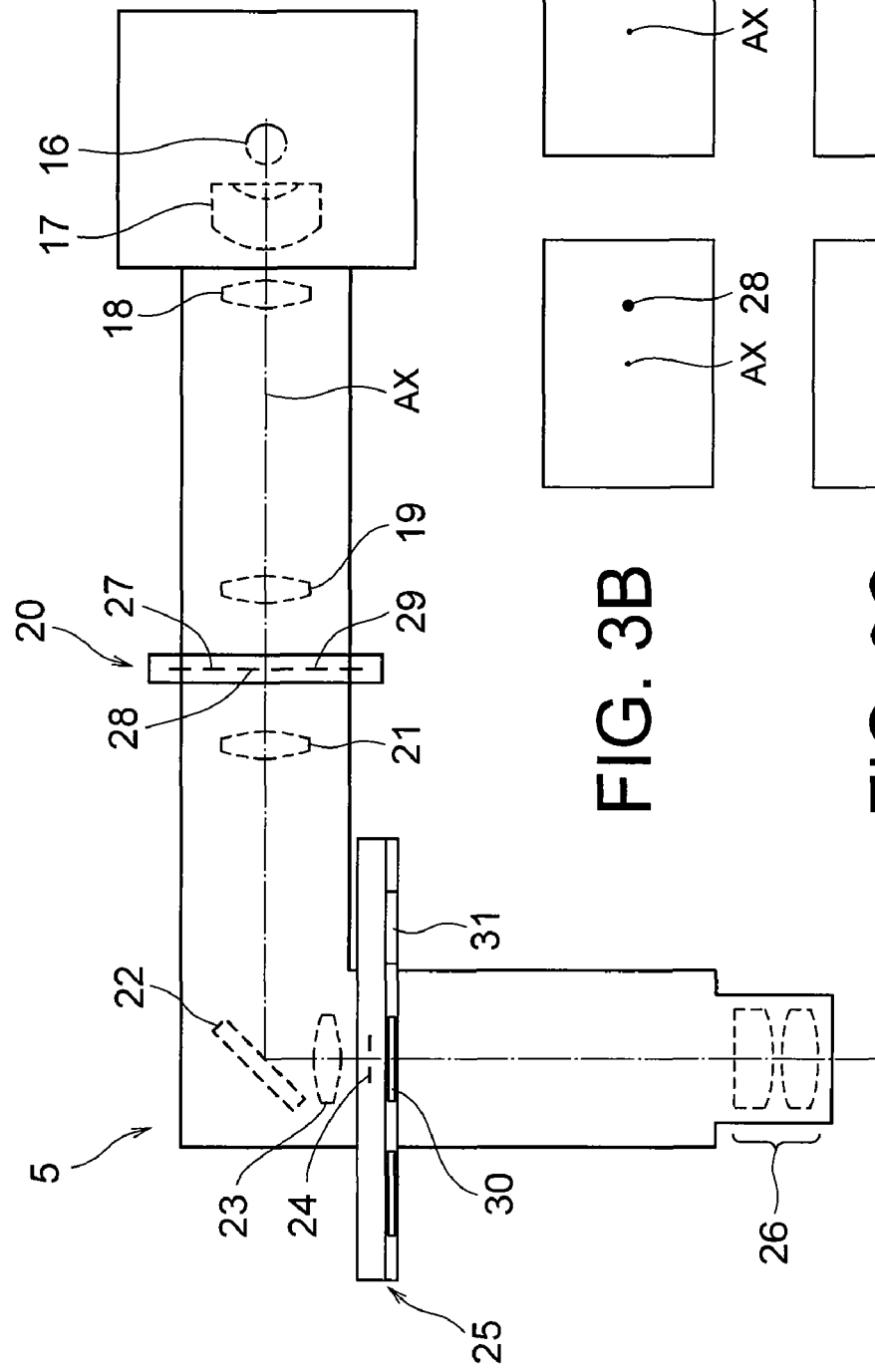
FIGS. 3A-3C are views showing an episcopic illumination device according to the first embodiment of the present invention.
Figure 3B:
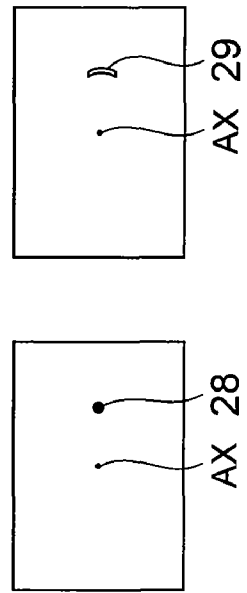
Figure 3C:
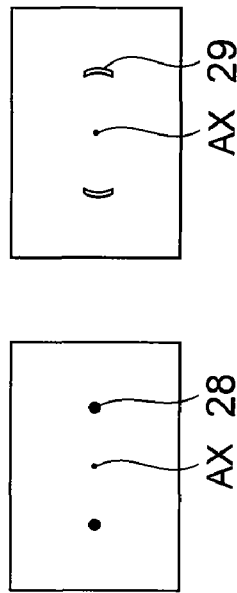

FIGS. 3A-3C are views showing an episcopic illumination device according to the first embodiment of the present invention.

As shown in FIG. 3A, the episcopic illumination device 5 according to the first embodiment is an illumination device that leads light from a light source into the above-mentioned block exchange unit 8, and illuminate the sample 15 through the objective 7. The episcopic illumination device 5 includes, in order from a mercury lamp 16 disposed as a light source, a collector lens 17, lenses 18 and 19, an aperture stop unit 20 disposed at a rear focal plane or a plane conjugate with a rear focal plane of the objective 7, a lens 21, a mirror 22, a lens 23, a field stop 24 conjugate with the sample plane, a polarizer unit 25, and a lens 26.

The aperture stop unit 20 includes an aperture stop 27, a pinhole 28 with a small diameter as a minute aperture, and a slit 29 with an arc shape centered around the optical axis AX, and they are disposed movably up and down in FIG. 3A, so that a user can selectively dispose them into the optical path by sliding an operation knob (not shown). When the aperture stop 27 is disposed into the optical path, the aperture stop 27 is centered on the optical axis AX, and is an ordinary aperture stop for an episcopic illumination device having a larger aperture than the pinhole 28 or the slit 29.

Since the position of the image side focal plane of the objective along the optical axis slightly varies with respect to the kind of the objective, it becomes necessary to introduce an adjustment mechanism to keep conjugate relation between the image side focal plane of each objective and the aperture stop 27 or the slit 29. As for the adjustment method, the aperture stop unit 20 may be moved along the optical axis. However, in the present embodiment, the adjustment is carried out by moving the lens 26 along the optical axis. In this case, the aperture stop 27 and the slit 29 may be disposed at the plane conjugate with the image side focal plane of the objective within the range of the adjustment. With moving the lens 26 along the optical axis in accordance with the kind of the objective, it becomes possible to always keep conjugate relation between the image side focal plane and the aperture stop 27 or the slit 29 within the range of the adjustment error.

The aperture stop unit 20 has a fine adjustment mechanism, which is explained later, so that the distance between the optical axis and pinhole 28 or slit 29 can be finely adjusted within the plane perpendicular to the optical axis. Accordingly, it becomes possible to adjust the position within the rear focal plane of the objective 7 or the position within the plane conjugate with the rear focal plane of the objective 7, in other words, it becomes possible to illuminate at Brewster angle or in the vicinity thereof, or to illuminate at an angle causing total internal reflection by adjusting an angle of incidence of the illumination light to the specimen 15. As for the illumination angle range in the vicinity of the Brewster angle, it is preferable that the illumination angle range is Brewster angle ±10 degrees.

As shown in FIG. 3B, the pinhole 28 is a pinhole with a small diameter, and the slit 29 is a slit having an arc shape centered at the optical axis AX. Accordingly, upon carrying out illumination at Brewster angle or at an angle causing total reflection, a high contrast image can be obtained by selecting the pinhole 28, and a bright image can be obtained by selecting the slit 29.

Moreover, the pinhole 28 and the slit 29 are rotatably disposed around the optical axis AX. Accordingly, it becomes possible to change the direction in which the image of the sample 15 to be observed is given contrast.

Furthermore, the pinhole 28 and the slit 29 can be rotated continuously with a constant speed. With this configuration, the image of the sample with contrast having no directional character can be obtained. In the present embodiment, in particular, the rotation period is set to a video-rate or less, so that it becomes possible to obtain the sample image free from directional contrast in real time by the CCD camera 10.

The pinhole 28 and the slit 29 may be disposed a plurality of numbers on the circumference centered on the optical axis AX, in particular, as shown in FIG. 3C, the pinhole 28 and the slit 29 may be disposed two each opposite with each other centered on the optical axis AX. With this configuration, upon carrying out illumination at Brewster angle or at an angle causing total reflection, the sample 15 is illuminated from both sides with the optical axis AX in between, so that deviation of illumination direction can be dissolved.

Figure 9:
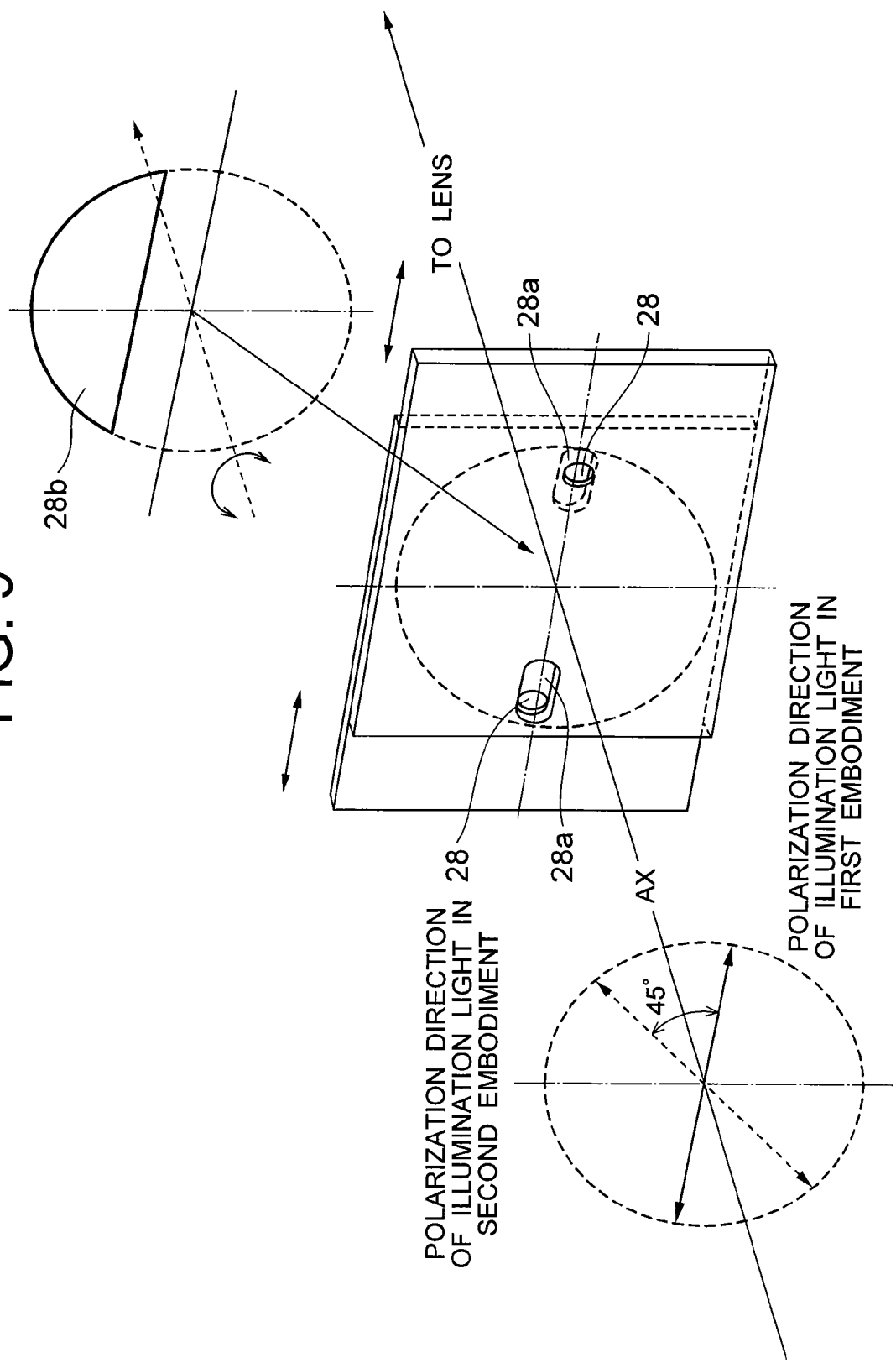
FIG. 9 is a view showing a fine adjustment mechanism and pinholes 28 in FIGS. 3B and 3C.
Figure 10A:
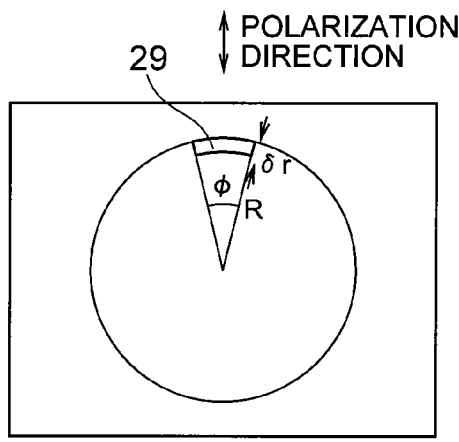
FIGS. 10A-10C are views showing the slit 29 installed in the aperture stop unit 20 of the inverted microscope according to each embodiment of the present invention.
Figure 10B:
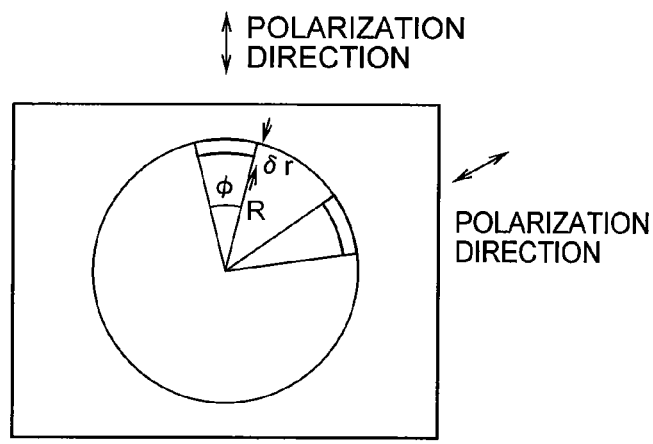

FIG. 9 is a view showing a fine adjustment mechanism and pinholes 28 in FIGS. 3B and 3C, and FIGS. 10A and 10B are views showing a fine adjustment mechanism and slits 29 shown in FIGS. 3B and 3C. In FIGS. 9, 10A and 10B, the direction of oscillation of the linearly polarized light explained later in the first and second embodiments is also shown.

As shown in FIG. 9, two plates on each of which a pinhole 28 and an elliptical aperture 28a are formed with the optical axis AX in between are superposed with each other such that each pinhole 28 and each aperture 28a face each other. By relatively sliding the two plates with each pinhole 28 and each aperture 28a facing each other such that distances between the optical axis AX and respective pinholes become equal, it becomes possible to finely adjust the distance between the optical axis and the pinhole on a plane perpendicular to the optical axis AX.

Figure 10C:
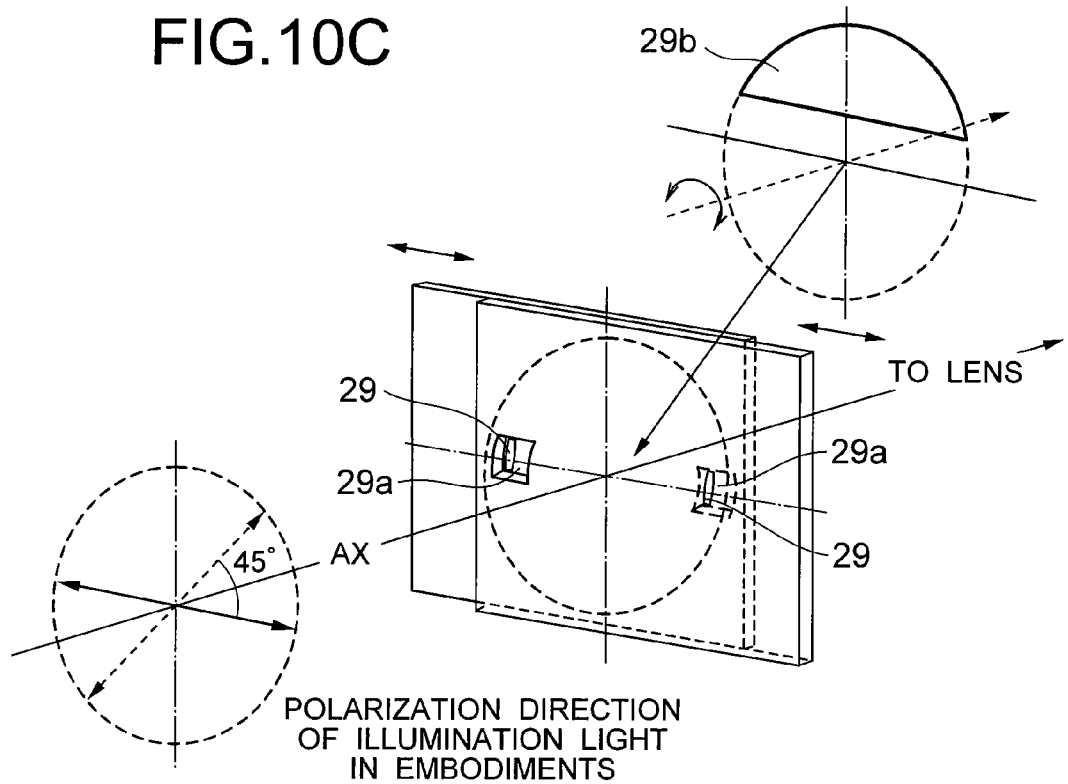

A shutter plate 28b is rotatably disposed to the two plates around the optical axis Ax. Accordingly, it becomes possible to select the number (one or two) of pinhole 28. Moreover, the two plates are devised to be rotated around the optical axis AX, so that the position of the pinhole 28 can be rotated around the optical axis AX. The slit 29 and a fine adjustment mechanism shown in FIG. 10C have apertures 29a and a shutter plate 29b corresponding to the apertures 28a and a shutter plate 28b shown in FIG. 9, and the configuration is similar to FIG. 9, so that explanation is omitted.

The polarizer unit 25 has a polarizer 30 and a hole 31, and they are slidably disposed in right and left directions in FIG. 3A, and can be selectively disposed in the optical path. The polarizer 30 transmits only linearly polarized light in the illumination light, and its direction of polarization is horizontal.

The inverted microscope 1 according to the present embodiment as described above makes it possible to carry out observations such as an observation with illuminating a sample 15 with a Brewster angle (hereinafter called a Brewster observation), an observation using surface plasmon resonance effect (hereinafter called a surface plasmon observation), and an observation with illuminating at an angle causing total reflection. Such illuminations are explained below.

Upon carrying out a Brewster observation by an inverted microscope according to the present embodiment, the beam splitter 11 in the block exchange unit 8 is disposed into the optical path, and the total reflection prism 14 in the optical path exchange unit 9 is disposed into the optical path (when an eyepiece observation is to be carried out at the same time, the prism 13 should be selected). Moreover, in the episcopic illumination device 5, the pinhole 28 in the aperture stop unit 20 is disposed into the optical path (here, when you attach importance to the brightness of the observation, the slit 29 may be selected), and the polarizer 30 in the polarizer unit 25 is disposed into the optical path.

In the episcopic illumination device 5 with the above-described setting, light emitted from the mercury lamp 16 passes through the pinhole 28 via the lenses 18 and 19, and incident on the polarizer 30 via the lens 21, the mirror 22, the lens 23, and the field stop 24. Only linearly polarized light among the light passes through the polarizer 30, and is led to the beam splitter 11 in the microscope base 2 through the lens 26. Then, the light is led to the objective 7 through the beam splitter 11, proceeds in the objective 7 as shown in FIG. 4, and is incident on the sample 15 with a Brewster angle (with respect to the boundary surface between cells 35 and a cover glass 36 explained later) as shown by the illumination light 37 in FIG. 4.

Figure 4:
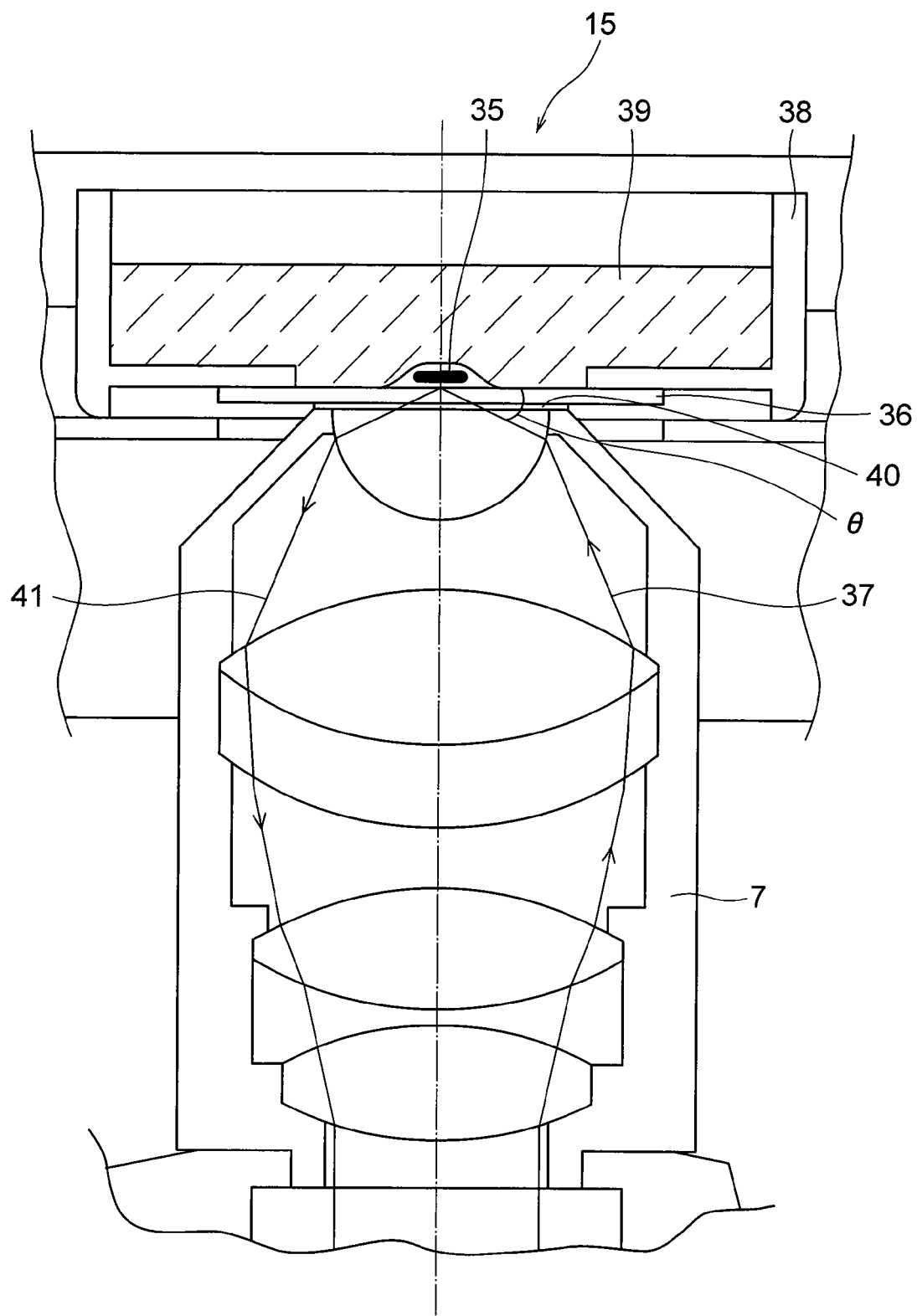
FIG. 4 is an enlarged view along A-A line in FIG. 1 showing an aspect where a sample is illuminated and observed with Brewster angle by the inverted microscope according to the first embodiment of the present invention.

FIG. 4 is an enlarged view along A-A line in FIG. 1 showing an aspect where a sample is illuminated and observed with a Brewster angle by the inverted microscope according to the first embodiment of the present invention. As for the sample 15 of the Brewster observation according to the present embodiment, for example, cells are used such that as shown in FIG. 4 a petri dish 38 having an aperture at the bottom is disposed on the cover glass 36 on which cells 35 are placed, and is filled with a culture fluid 39, so that it becomes possible to observe live cells for few hours to few days with properly keeping environment conditions such as temperature, carbon dioxide density, and the like by a reflux apparatus. As described above, the objective 7 is an immersion objective with a high numerical aperture, and is disposed in close vicinity to the lower side of the cover glass 36, and the space between the tip of the objective and the cover glass 36 is filled with oil 40.

The incident angle $\theta$ of the illumination light to the cells 35 can be varied by adjusting the position of the pinhole 28 in the episcopic illumination device 5 by means of the aforementioned fine adjustment mechanism (when the slit 29 is selected upon setting, the position of the slit 29 should be adjusted). Accordingly, in the Brewster observation, it becomes possible to set the incident angle $\theta$ to the Brewster angle or in the vicinity thereof.

Reflection light 41 from the cells 35 illuminated as described above proceeds through the objective 7, and is led to the CCD camera 10 via the beam splitter 11 and the total reflection prism 14. In this manner, observation image is obtained by the CCD camera 10, and the cells 35 can be observed with the Brewster observation. In the Brewster observation according to the present embodiment, it becomes possible to observe a form in the vicinity of a boundary surface of a material composing cells or a material with polarization dependency, such as a high molecular compound and protein, disposed in the vicinity of solid-liquid interface.

When the cells 35 are prepared with fluorescent stain, by exchanging the beam splitter 11 in the microscope base 2 with the fluorescence filter block 12, it becomes possible to lead fluorescence emitted from the cells 35 into the CCD camera 10, so that the cells 35 can be observed with a fluorescence observation. In other words, by exchanging the beam splitter 11 with the fluorescence filter block 12, it becomes possible to exchange a Brewster observation with a fluorescence observation of the cells 35 with an oblique illumination at the same time. In the fluorescence observation with an oblique illumination, there is a merit to be able to observe a thick portion in the depth direction of the cells.

Upon carrying out a surface plasmon observation with the inverted microscope 1 according to the present embodiment, the cells are used as a sample 15 in a similar manner as the above-described Brewster observation, a cover glass 44 on which a gold alloy thin film 43 made from Au, Cr, Ag, and Al in atomic symbols (a gold thin film with a thickness of about 50 nm in the present embodiment) is formed on the contact surface with the cells is used.

Figure 5:
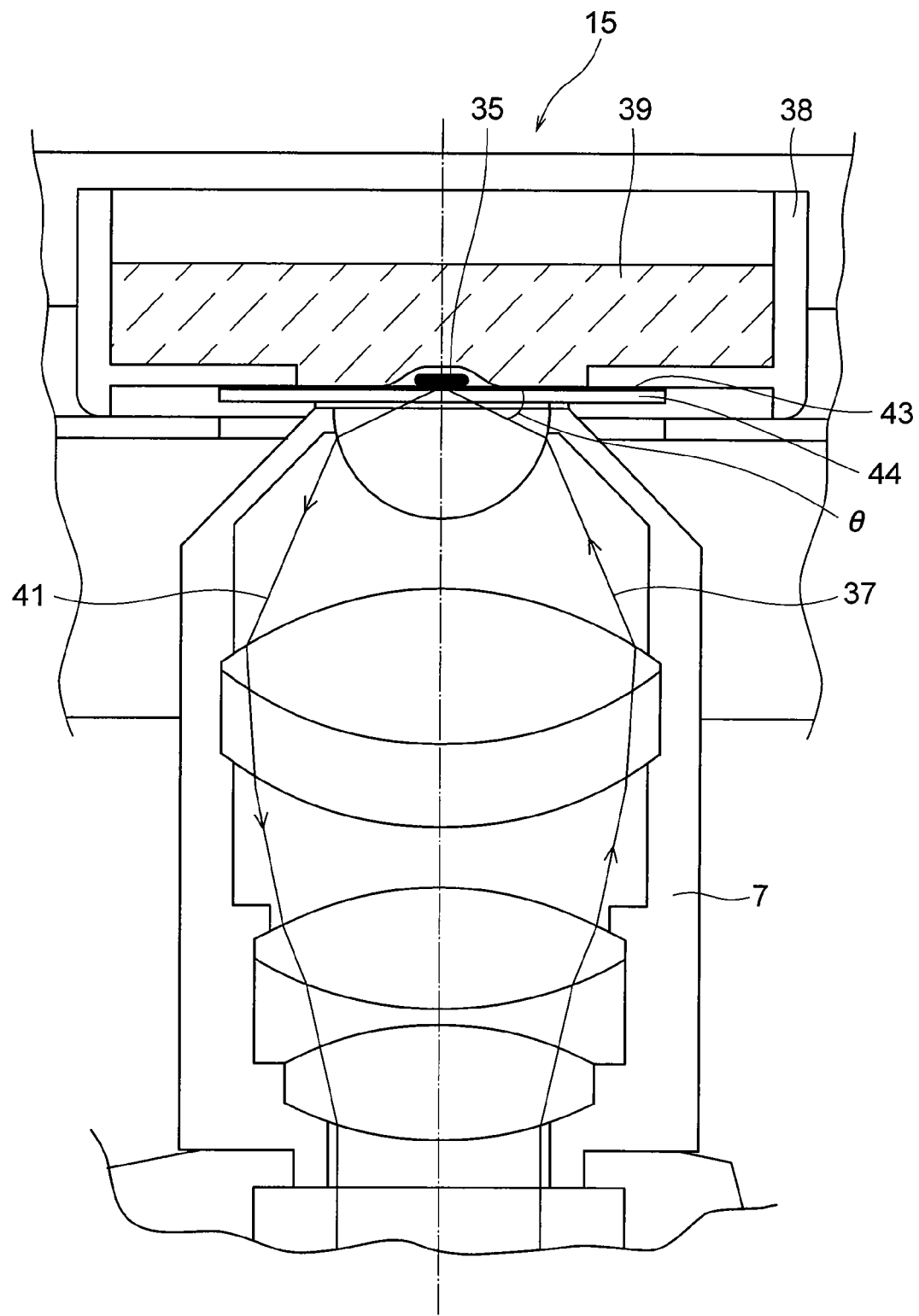
FIG. 5 is an enlarged view along A-A line in FIG. 1 showing an aspect where a sample is observed using surface plasmon resonance by the inverted microscope according to the first embodiment of the present invention.

When the main component of the film is gold, the light source having the wavelength range of 500 nm or more ($\lambda=500$ nm to 1100 nm, practically $\lambda=600$ nm or more) is used. When the main component of the film is silver, the light source having the wavelength range of 500 nm or less ($\lambda=380$ nm to 500 nm) is used. FIG. 5 is an enlarged view along A-A line in FIG. 1 showing an aspect where a sample is observed using surface plasmon resonance by the inverted microscope according to the first embodiment of the present invention.

The microscope base 2 and the episcopic illumination device 5 are the same setting as the above-described Brewster observation. The position of the pinhole 28 in the episcopic illumination device 5 is adjusted to set an angle $\theta$ of incidence of the illumination light with respect to the cells 35 to an angle generating surface plasmon resonance on the boundary surface between the cells 35 and the gold thin film 43 (in the present embodiment, an angle generating total reflection).

The reflected light 41 from the cells 35 illuminated with the above-described configuration is led to the CCD camera 10 through the objective 7, the beam splitter 11, and the total reflection mirror 14 as the same as the Brewster observation. In this manner, the observation image is obtained by the CCD camera 10, thereby enabling the surface plasmon observation of the cells 35. In the surface plasmon observation, it becomes possible to observe a material composing cells or a material with polarization dependency, such as a structural change of a high molecular compound and protein, disposed in the vicinity of solid-liquid interface.

When the cells 35 are prepared with fluorescent stain, by exchanging the beam splitter 11 in the microscope base 2 with the fluorescence filter block 12, it becomes possible to lead fluorescence emitted from the cells 35 into the CCD camera 10, so that the cells 35 can be observed with a fluorescence observation. In other words, by exchanging the beam splitter 11 with the fluorescence filter block 12, it becomes possible to exchange a surface plasmon observation with a fluorescence observation of the cells 35 with an oblique illumination (here, a total reflection illumination) at the same time.

When an observation with a total reflection illumination is carried out by the inverted microscope 1 according to the present embodiment, the fluorescence filter block 12 in the block exchange unit 8 is disposed into the optical path in the microscope base 2, the episcopic illumination device 5 is set similar to the above-described Brewster observation, and cells stained with fluorescent stain is used as a sample 15. The position of the pinhole 28 in the episcopic illumination device 5 is adjusted to set an angle $\theta$ of incidence of the illumination light with respect to the cells 35 to an angle generating total reflection on the boundary surface between the cells and the cover glass.

The fluorescence emitted from the sample 15 illuminated with the above-described configuration is led to the CCD camera 10 through the objective 7, the fluorescence filter block 12, and the total reflection mirror 14 as the same as the Brewster observation. In this manner, the observation image is obtained by the CCD camera 10, thereby enabling the fluorescence observation of the sample 15 by total reflection illumination.

Regarding the inverted microscope according to the present embodiment, in the microscope base 2, the fluorescence filter block 12 in the block exchange unit 8 is disposed into the optical path, and the total reflection mirror 14 in the optical path exchange unit 9 is disposed into the optical path. In the episcopic illumination device 5, the aperture stop 27 in the aperture stop unit 20 is disposed into the optical path, and the hole 31 in the polarizer unit 25 is disposed into the optical path.

In this episcopic illumination device 5, light emitted from the mercury lamp 16 is led to the fluorescence filter block 12 in the microscope base 2 through the above-described members in the episcopic illumination device 5. Then, the light is led to the objective 7 by the fluorescence filter block 12, and incident on the sample 15 through the objective 7.

Fluorescence emitted from the sample 15 illuminated in this manner is led to the CCD camera 10 through the objective 7, the fluorescence filter block 12, and the total reflection mirror 14. In this way, the observation image is obtained by the CCD camera 10, and an ordinary episcopic fluorescence observation of the sample 15 can be performed.

Moreover, since the inverted microscope according to the present embodiment is equipped with the above-described diascopic illumination device 3, and the eyepiece tube 4, it becomes possible to observe with the diascopic illumination, and to perform a naked eye observation in the above described each observation except fluorescence observation.

As described above, the inverted microscope according to the present embodiment is equipped with the mercury lamp 16 as a light source for the episcopic illumination device 5. However, the present invention is not limited to this, and may take such configuration that a laser light source (a laser light source with a converging point of the laser light conjugate with the pupil of the objective) is used as the light source, and the pinhole 28 and the slit 29 in the aperture stop unit 20 can be omitted, so that a bright observation image can be obtained. As for the laser light source, it is preferable that an emitting position of the laser beam is adjustable in the direction perpendicular to the optical axis (with this configuration, the converging point can be adjusted in the direction perpendicular to the optical axis), the emitting position is rotatable around the optical axis (with this configuration, the converging point can be rotated around the optical axis), and a plurality of emitting positions are disposed on a circumference of a circle having the center on the optical axis (with this configuration, a plurality of converging points can be disposed). In addition to such configurations, by disposing a speckle removing optics, such as a diffuser, in the episcopic illumination device 5, it becomes possible to obtain an observation image with better image quality.

The inverted microscope according to the present embodiment makes it possible to perform all observations such as a Brewster observation, a surface plasmon observation, and an observation with a total reflection illumination by changing settings for the microscope base 2 and the episcopic illumination device 5 as described above. However, the present invention is not limited to this, and it is naturally possible to compose a microscope that limits the combination such as a Brewster observation only, a Brewster observation and an observation with a total reflection illumination, and the like.

Since the inverted microscope according to the present embodiment has a configuration that the objective 7 is disposed directly under and in close vicinity to the sample 15, an objective with a high numerical aperture can be used, thereby realizing the apparatus to be high resolution. Moreover, since the apparatus has a configuration that the image of the sample 15 is formed by the objective 7 disposed vertically to the sample, it is no longer necessary to use an optical system for correcting inclination of the image plane by means of a CCD camera, which has been necessary for the conventional technique.

Furthermore, since the inverted microscope according to the present embodiment secures a free space on the stage 6 by disposing optical systems including objective 7 and the episcopic illumination device 5 under the stage 6, the sample 15 can easily be placed on the stage 6, so that it is particularly effective upon observing cells alive.

Second Embodiment

In an inverted microscope according to a second embodiment of the present invention, a portion that has the similar configuration as the inverted microscope according to the first embodiment is attached with the same symbol and the explanation thereof is omitted, and a distinctive portion is explained in detail.

Figure 6:
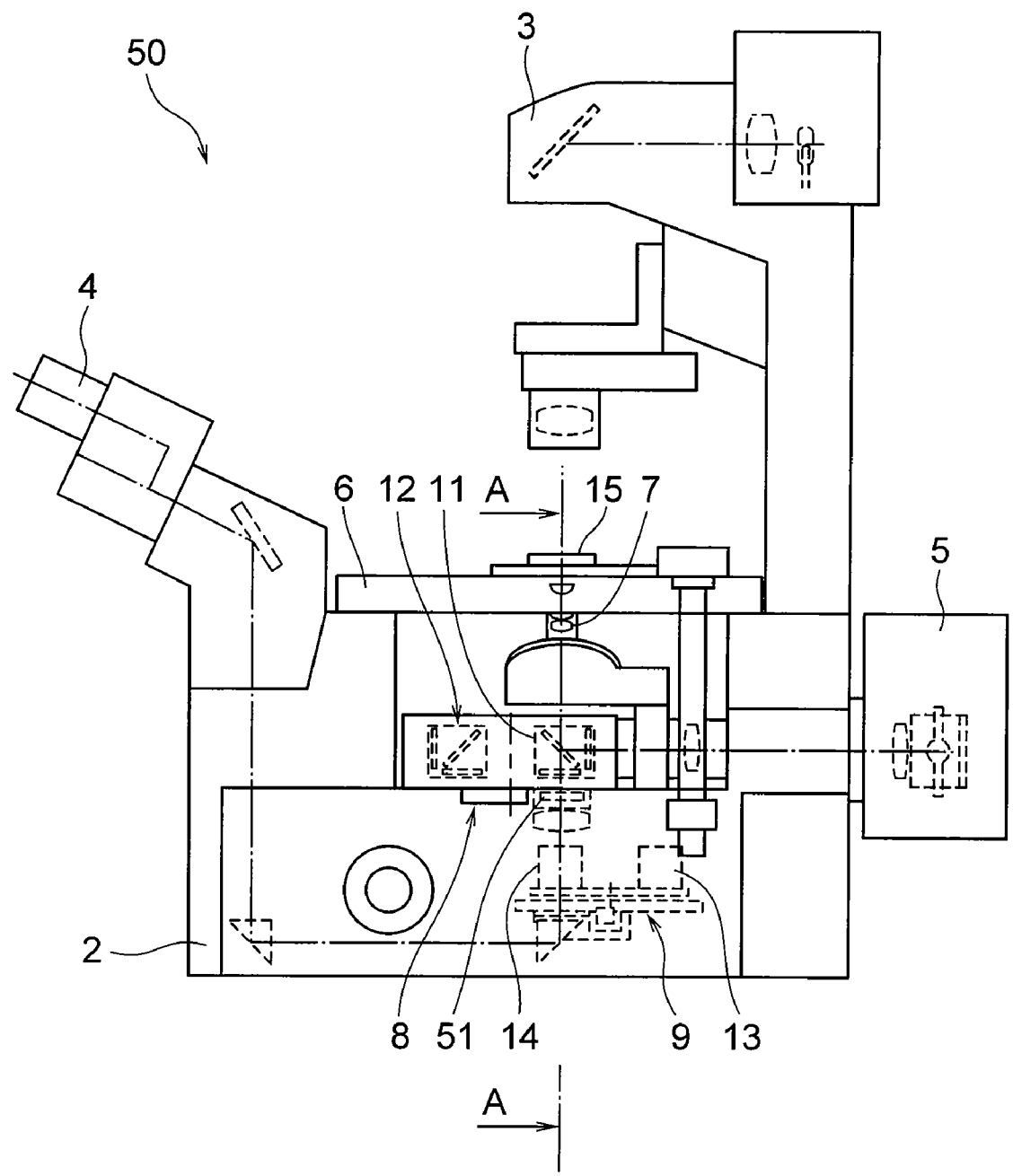
FIG. 6 is a side view showing a configuration of an inverted microscope according to a second embodiment of the present invention.
Figure 7:
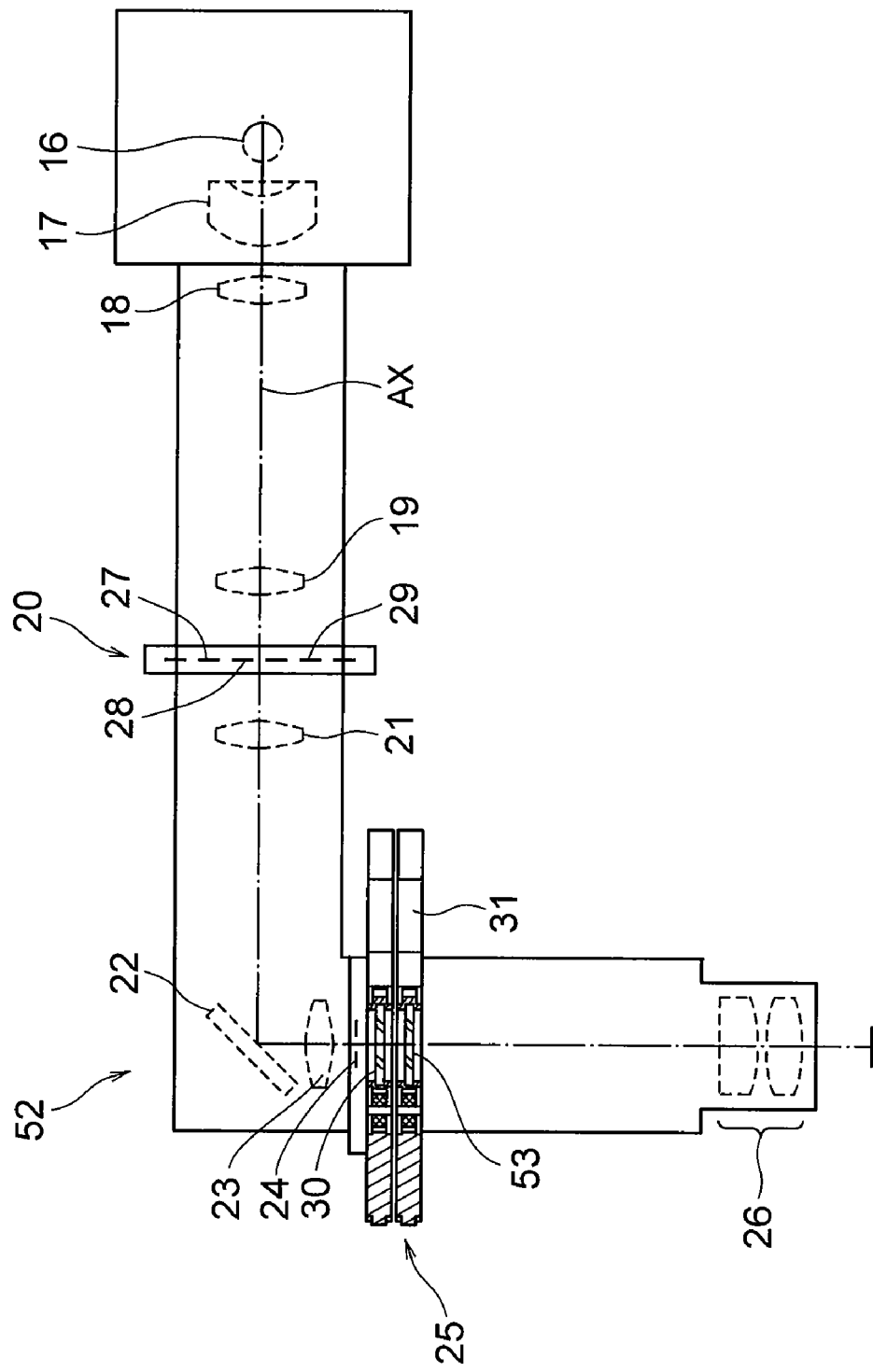
FIG. 7 is a view showing an episcopic illumination device according to the second embodiment of the present invention.
Figure 8:
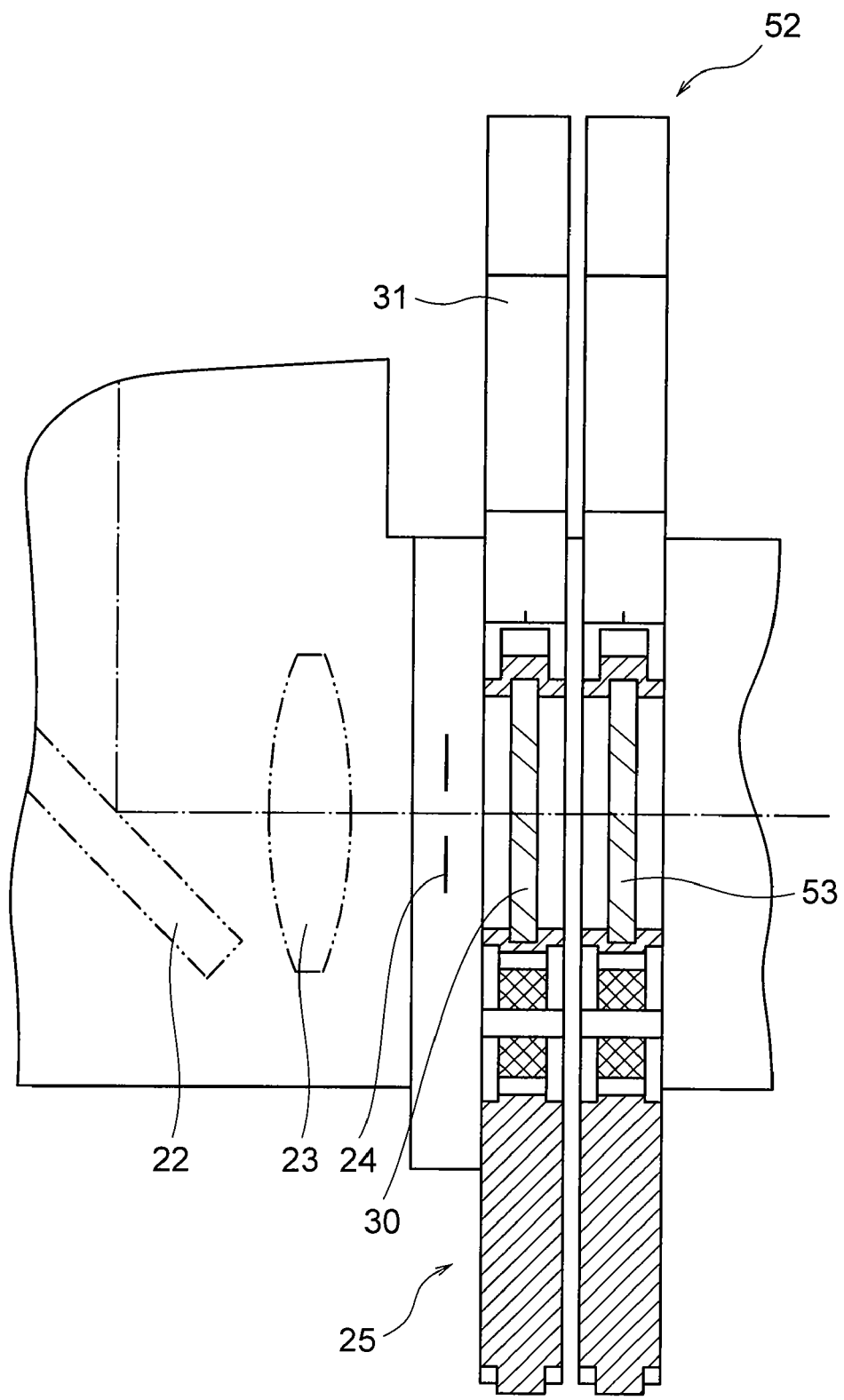
FIG. 8 is a partially enlarged view showing an episcopic illumination device according to the second embodiment of the present invention.

FIG. 6 is a side view showing a configuration of an inverted microscope according to the second embodiment of the present invention. FIGS. 7 and 8 are a view and a partially enlarged view, respectively, showing an episcopic illumination device according to the second embodiment of the present invention.

As shown in FIG. 6, in a microscope base 2 in an inverted microscope 50 according to the present embodiment, there is provided an analyzer 51 between a beam splitter 11 and an optical path exchange unit 9, which is removable from the optical axis and adjustable in a rotatable manner around the optical axis.

As shown in FIGS. 6 and 7, in the episcopic illumination device 52 according to the present embodiment, there is provided a quarter-wave plate 53 between a polarizer unit 25 and a lens 26, which is removable from the optical axis and adjustable in a rotatable manner around the optical axis. Moreover, the polarizer 30 according to the present embodiment can rotatably be adjusted around the optical axis, so that the polarizer 30 can be set such that only linearly polarized light having an oscillation direction making an angle of 45 degrees with respect to the incident plane of the light from the light source 16 among the light emitted from the light source 16 is transmitted.

With this configuration in the inverted microscope 50 according to the present embodiment, the polarizer 30 is set ad described above, the analyzer 51 and the quarter-wave plate 53 are disposed into the optical path, the other microscope elements are set as in the above-described case of the Brewster observation according to the first embodiment.

Accordingly, the light passing through the polarizer 30 that is oriented in the 45 degrees is incident on the objective 7 to illuminate the sample 15 after passing through the quarter-wave plate 53 set in a suitable direction. The reflected light from the sample 15 is passed through the analyzer 51 that is rotated in a suitable direction, and formed an image, so that the observed image can be obtained.

When the reflection light reflected from a portion of the sample is considered, the reflectance and phase difference between s-polarized light and p-polarized light of the reflected light vary. in accordance with physical property of the sample such as complex refractive index, anisotropy of refractive index, thickness, and the like. when phase difference between s-polarized light and p-polarized light after the reflection from the sample is made to be integral multiple of n by the quarter-wave plate 54, the reflected light becomes linearly polarized light, so that the reflected light can be extinct by the analyzer 51 suitably adjusted in a rotation direction.

Since the other portions not satisfying the relation do not be extinct, when the light passed through the analyzer 51 forms an image, the sample is observed such that the portion satisfying the condition becomes dark (extinct) and the other portions become bright. Accordingly, the other portions of the sample can also be extinct by changing the condition.

Then, by measuring rotation angles of the quarter-wave plate 53 and the analyzer 51, it becomes possible to derive the ratio of amplitude reflectance of p-polarized light to that of s-polarized light, so that complex refractive index and anisotropy of refractive index of the portion can be examined therefrom. As for the analyzing method, there are listed a method used in ellipsometry and a document (S. Henon and Meunier, "Microscopy at the Brewster angle: Direct observation of first-order phase translation in monolayers," Rev. Sci. Instru. Vol. 62, pp. 936-939 (1991).)

Accordingly, the inverted microscope 50 according to the present embodiment can be used in ellipsometry for examining complex refractive index and anisotropy of the sample in addition to each observation able to be performed by the inverted microscope according to the first embodiment.

According to each embodiment, it becomes possible to realize an inverted microscope capable of observing with a high resolution a material with polarization dependency such as a high molecular compound and protein disposed at solid-liquid interface of the sample by illuminating cells immersed in a culture solution with a Brewster angle.

Then, an arc shape slit 29 equipped in the aperture stop unit 20 as a minute aperture, which is the most characteristic portion of the present invention, is explained.

The slit 29 equipped in the aperture stop unit 20 of the inverted microscope according to the present embodiment is designed on the basis of the following design conditions.

At first, a case performing a Brewster observation using the slit 29 is to be considered. In the slit 29 shown in FIG. 10A, assuming that radius of an arc is R, a width in a radius direction is δr, a center angle of the arc is φ, a Brewster angle θB preferably satisfies the following expression (A):

$$\theta B = a\tan(ns/ncg) \tag{A}$$

where ns denotes refractive index of the sample medium, and ncg denotes refractive index of the cover glass 36.

The radius R of the arc is derived from the following expression (B):

$$R = \sin(\theta B) \text{n-oil} \times f \tag{B}$$

where n-oil denotes refractive index of the immersion liquid (oil 40) of the objective 7 (in the case of a dry objective, n-oil=1), and f denotes a focal length of the objective 7.

Moreover, as for the sample, a case a minute cell structure 35 in the culture liquid 39 is sticking on the cover glass 36 is considered.

In this case, assuming that ns=1.33, ncg=1.51, then, the Brewster angle becomes θB=41.3 degrees from the expression (A). Here, assuming that n-oil=1.51, the radius of the arc is R/f=0.997 from the expression (B).

Moreover, modifying expression (B), R/f=n-oil×sin(θB), then R/f denotes a numerical aperture NA of the objective. Accordingly, from expression (B), the numerical aperture NA of the objective realizing the illumination according to the present invention can be derived. In the above-described numerical example, it is sufficient that an immersion objective with NA≧1 is used.

Here, assuming that the refractive index of the minute cell structure (35) ncell=1.35, the reflection light from the background, in other words, the sample medium and the reflection light from the signal light, in other words, the minute cell structure can be derived by using reflection coefficient expression of Fresnel and that of a single thin film.

Figure 11:
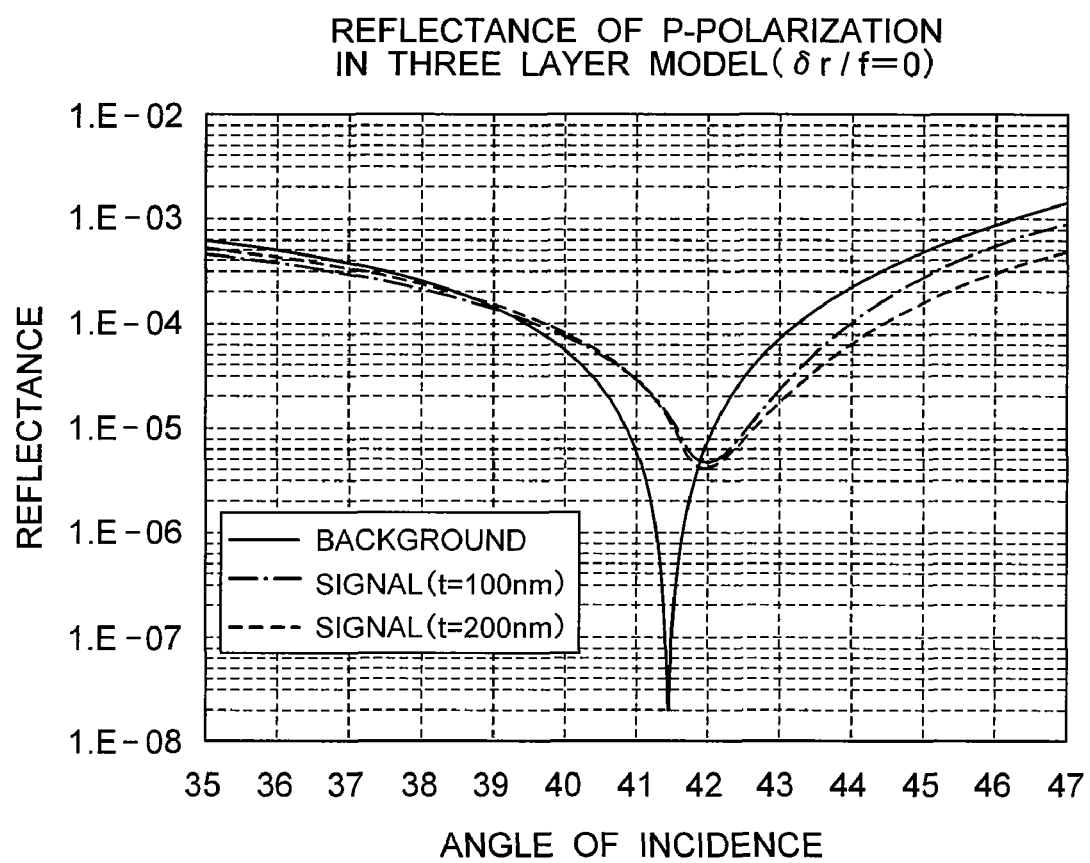
FIG. 11 is a graph showing intensity variation in signal light and that of background light upon varying an angle of incidence θ of an illumination light beam by means of moving the slit 29 in the radial direction when the radial width δr of the slit 29 in the aperture stop unit 20 is zero according to each embodiment of the present invention.

FIG. 11 is a graph showing intensity variation in signal light and that of background light upon varying an angle of incidence θ of an illumination light beam by means of moving the slit 29 in the radial direction when the radial width δr of the slit 29 in the aperture stop unit 20 is zero.

As shown in FIG. 11, since the light intensity of the background is about $10^{-8}$ to $10^{-7}$ and that of the signal light is about $10^{-5}$ to $10^{-4}$ in the vicinity of the Brewster angle θB=41.3 degrees, S/N ratio is about $10^3$, so that an image with good contrast can be obtained.

Here, in an actual inverted microscope, since illumination light is cut off when the radial width of the slit 29 δr=0, the radial width δr has to have a finite value. In the radial width δr, the larger the value becomes, the brighter the illumination light becomes, so that a bright observation image can be obtained. Moreover, the larger the radial width δr becomes, the less the coherence of the illumination light becomes, so that interference noise generated in the background of the observation image can be reduced.

However, the radial width δr of the slit 29 further becomes large, since the light whose angle of incidence on the sample 15 is shifted from θ is included in the illumination light whose angle of incidence is θ, as a result, the contrast of the observation image becomes low. Accordingly, the radial width δr of the slit 29 cannot be set excessively large, so that there is an upper limit.

Here, the above-described angular shift of "the light whose angle of incidence is shifted from θ" is called an "angular deviation" in this specification.

Figure 12:
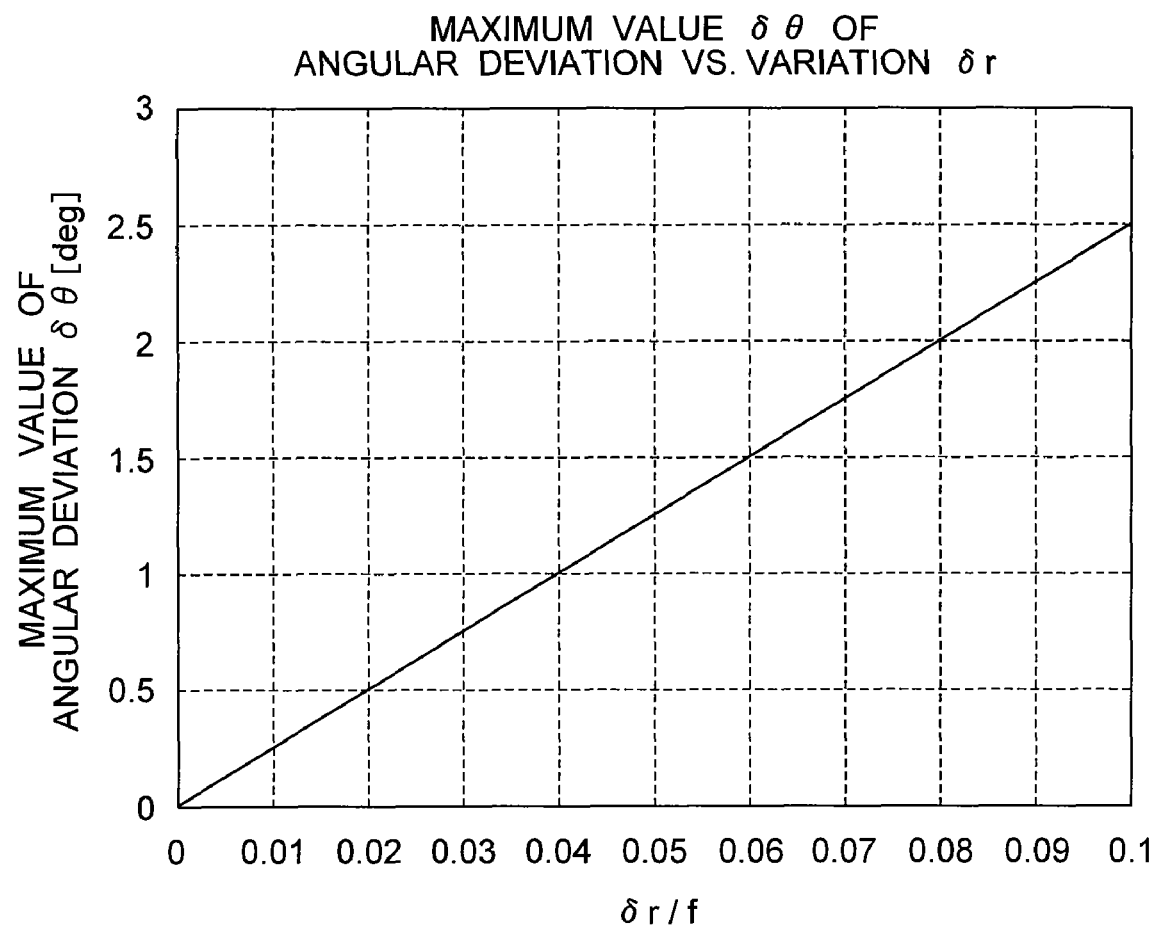
FIG. 12 is a graph showing the maximum value δθ of angular deviation upon varying the radial width δr of the slit 29 in the aperture stop unit 20 according to each embodiment of the present invention.

FIG. 12 is a graph showing the maximum value δθ of an angular deviation upon varying the radial width δr of the slit 29 in the aperture stop unit 20. The angle of incidence of the illumination light upon the Brewster angle is shown by θB. In the horizontal axis if the figure, δr is normalized by the focal length f of the objective 7.

As shown in FIG. 12, the maximum value δθ of the angular deviation is substantially proportional to δr/f, and the maximum value δθ of the angular deviation is about 0.75 degrees when δr/f=0.03, and the maximum value δθ of the angular deviation is about 1.5 degrees when δr/f=0.06.

As shown above, when the radial width δr of the slit 29 is a certain finite value, the background light and the signal light become integrated values of the graph shown in FIG. 11 within the range of the maximum value δθ of the angular deviation derived from FIG. 12.

Figure 13A:
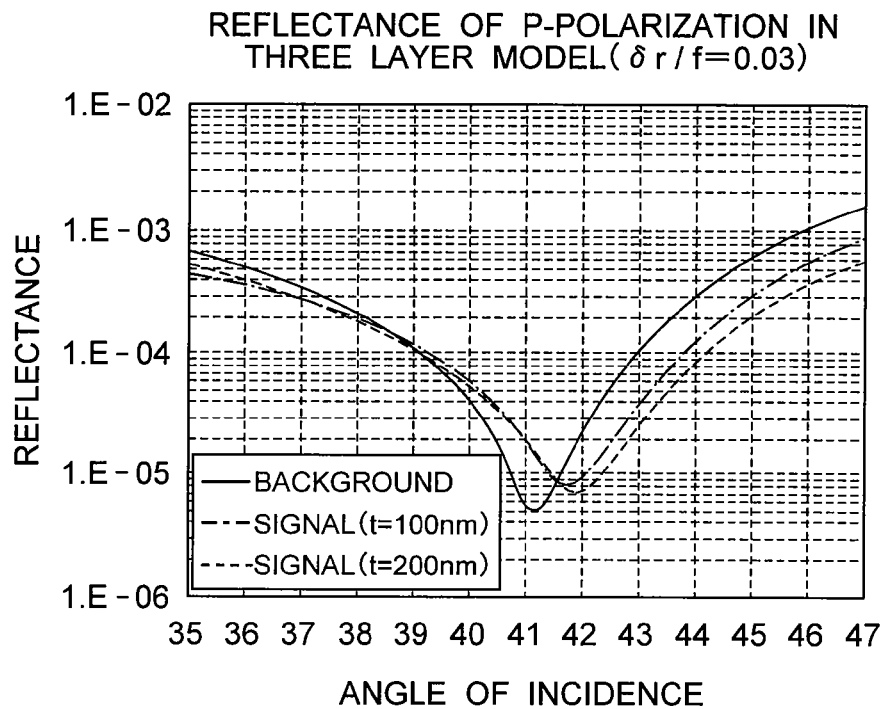
FIGS. 13A and 13B are graphs showing intensity variation in signal light and background light upon varying an angle of incidence θ of an illumination light beam by means of moving the slit 29 in the radial direction corresponding to FIG. 11 upon δr/f=0.03 and δr/f=0.06 according to each embodiment of the present invention.
Figure 13B:
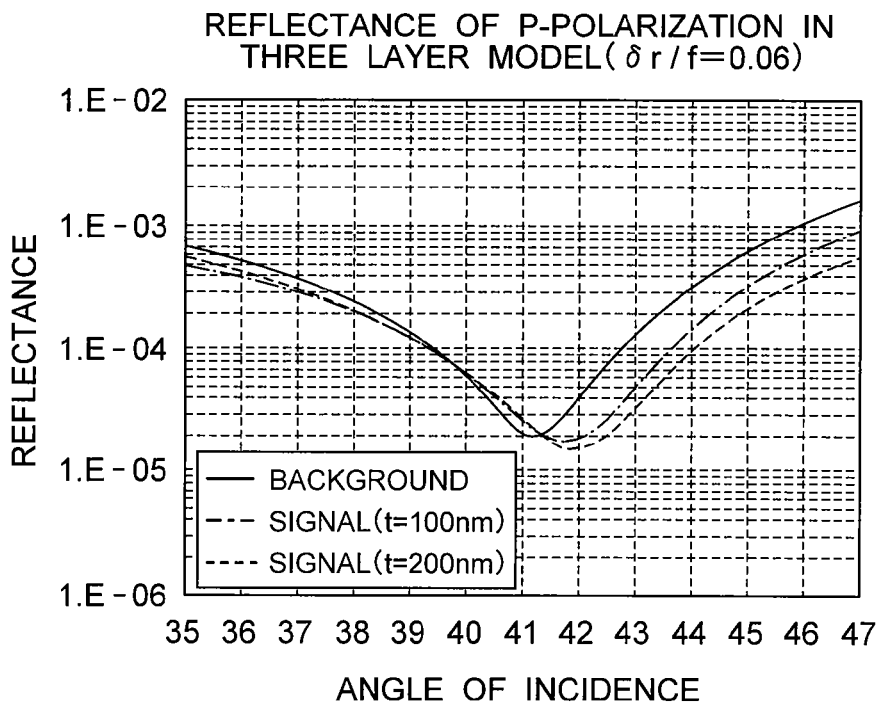

For example, in FIGS. 13A and 13B, graphs show intensity variation in signal light and background light upon varying an angle of incidence θ of an illumination light beam by means of moving the slit 29 in the radial direction corresponding to FIG. 11 upon δr/f=0.03 and δr/f=0.06.

As shown in FIGS. 13A and 13B, when the radial width δr of the slit 29 becomes large, the steep drops of the reflectance curves of the background light and the signal light in the vicinity of the Brewster angle shown in FIG. 11 become gradually shallow, and difference in light intensity between signal and background light becomes small. When the radial width δr becomes further larger, there will be an upper limit of the radial width δr where intensity of the background overturns that of signal light. Accordingly, since the signal light cannot be detected when intensity of the background light becomes stronger than that of the signal light, the value of the radial width where these values overturn becomes the upper limit.

Figure 14:
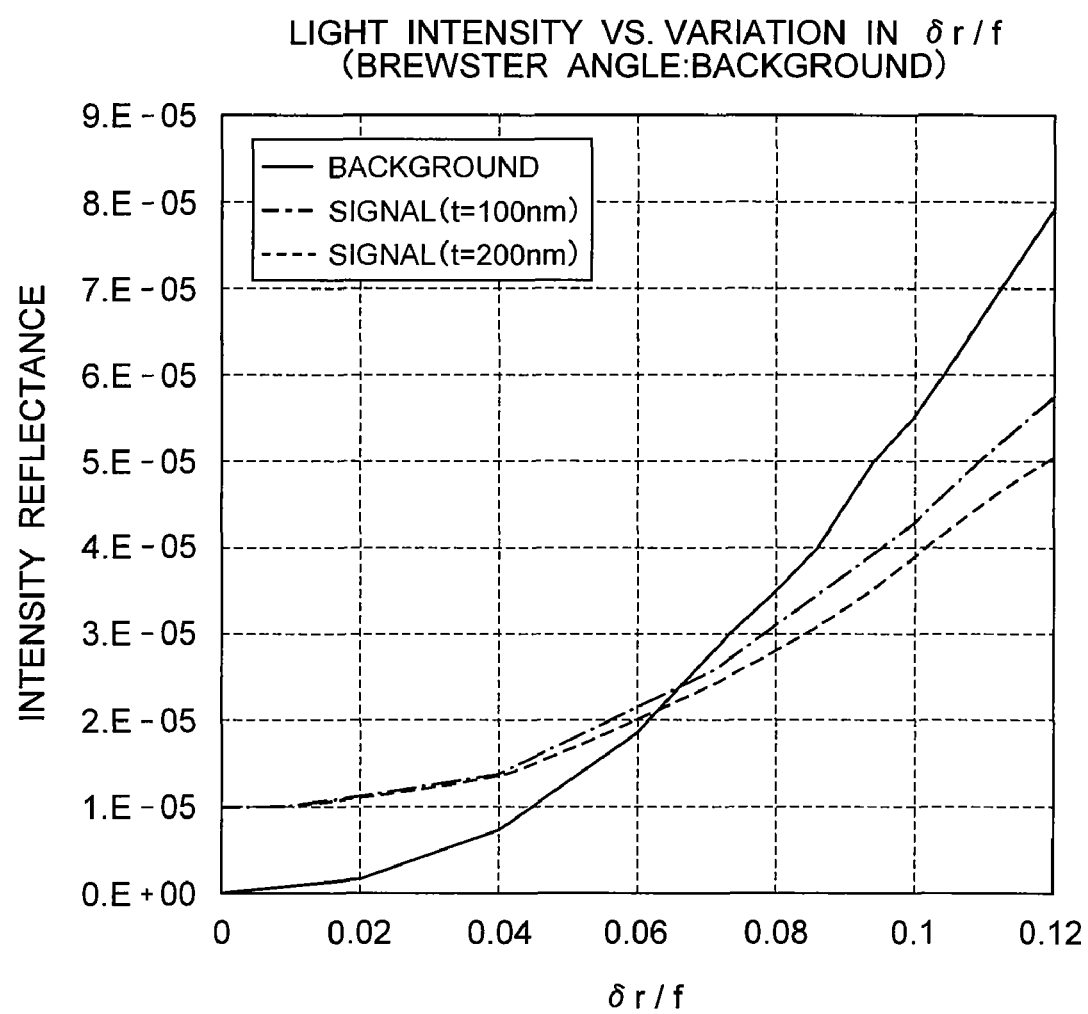
FIG. 14 is a graph showing intensity variation in signal light and background light upon varying δr/f when the angle of incidence θ is Brewster angle θB according to each embodiment of the present invention.

FIG. 14 is a graph showing intensity variation in signal light and background light upon varying δr/f when the angle of incidence θ is Brewster angle θB.

As shown in FIG. 14, it is understood that light intensity of the signal light and that of the background light overturns in the vicinity of δr/f=0.06. Accordingly, the value becomes the upper limit of the preferable radial width δr of the slit 29, so that the following conditional expression (1) is derived:

$$0 < \delta r \leq 0.06 \times f \tag{1}$$

where δr denotes the radial width of the slit 29, and f denotes the focal length of the objective 7.

It is further preferable to limit the range of the radial width δr by conditional expression (1'), so that intensity of the signal light is about two times stronger than that of the background light, and a good contrast observation image can be obtained:

$$0 < \delta r \leq 0.03 \times f \tag{1'}$$

where δr denotes the radial width of the slit 29, and f denotes the focal length of the objective 7.

On the other hand, as for the lower limit of the radial width δr of the slit 29, an arbitrary value satisfying δr≠0 may be set. This is because although the smaller the radial width δr becomes, the darker the observation image becomes, it becomes possible to detect the signal light by using an imaging device with a better sensitivity.

In this case, contrast of the observation image becomes high, so that S/B ratio in FIG. 11 reaches about $10^3$. On the other hand, coherence of the illumination light becomes high resulting in generation of interference fringe on the portion where refractive index or structure of the sample 15 changes drastically, so that S/N ratio becomes low.

Accordingly, since contrast and interference fringe noise of the observation image are in a trade-off relationship, it is most preferable that the radial width δr of the slit 29 is selected an optimum value within the range satisfying conditional expressions (1) and (1') in accordance with composition and a use of the microscope.

As for a central angle φ of the arc of the slit 29, the larger the central angle φ is set, the more s-polarized light is mingled into the linearly polarized light (p-polarized light) of the illumination light, so that the background light becomes bright and contrast of the observation image of the sample 15 becomes low. Accordingly, by means of calculating intensity ratio between p-polarized light and s-polarized light, the maximum value of the central angle φ can be derived.

Figure 15:
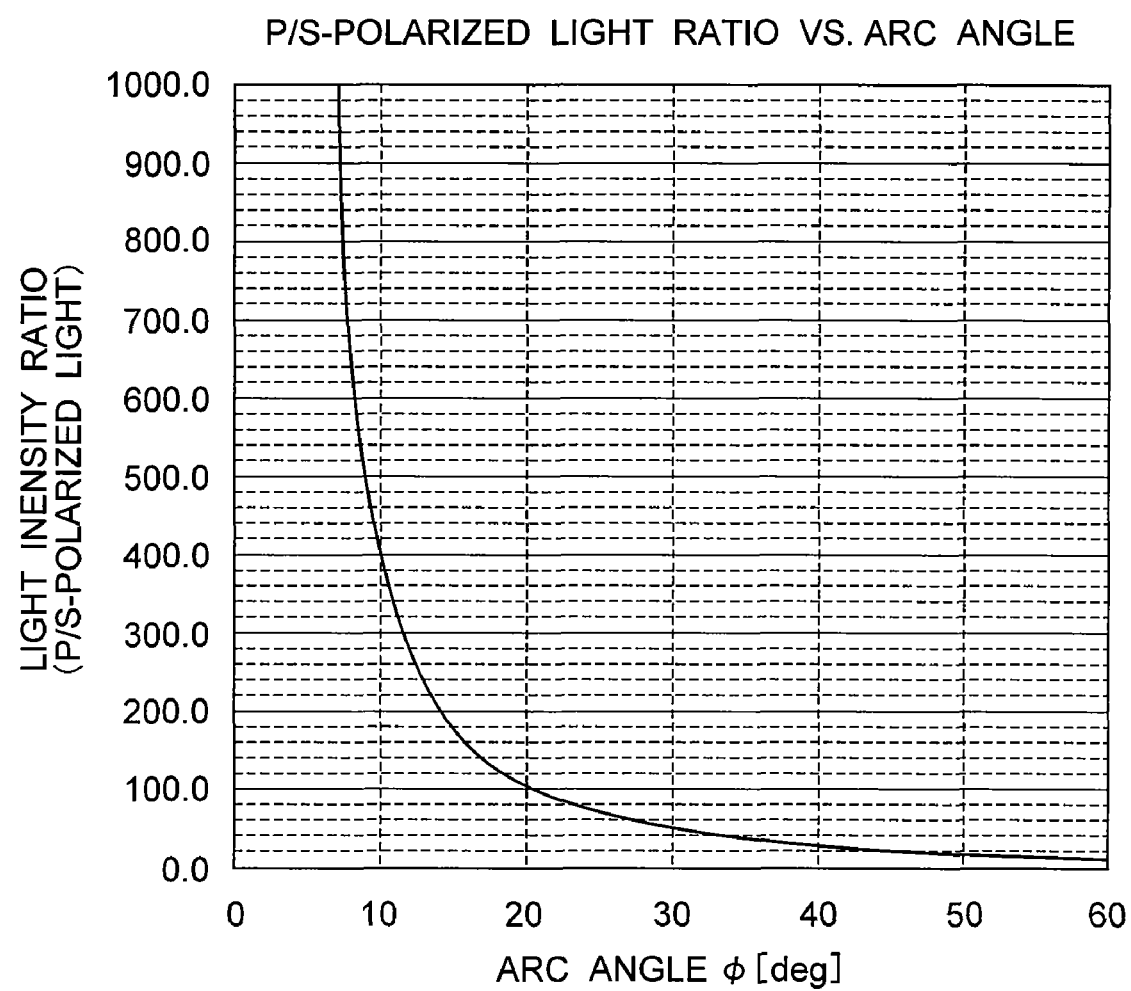
FIG. 15 is a graph showing intensity ratio between p-polarized light and s-polarized light included in illumination light upon varying only a central angle φ assuming the radial width δr of the slit 29 in the aperture stop unit 20 is the infinitesimal according to each embodiment of the present invention.

FIG. 15 is a graph showing intensity ratio between p-polarized light and s-polarized light included in illumination light upon varying only a central angle φ assuming the radial width δr of the slit 29 in the aperture stop unit 20 is the infinitesimal.

Figure 16:
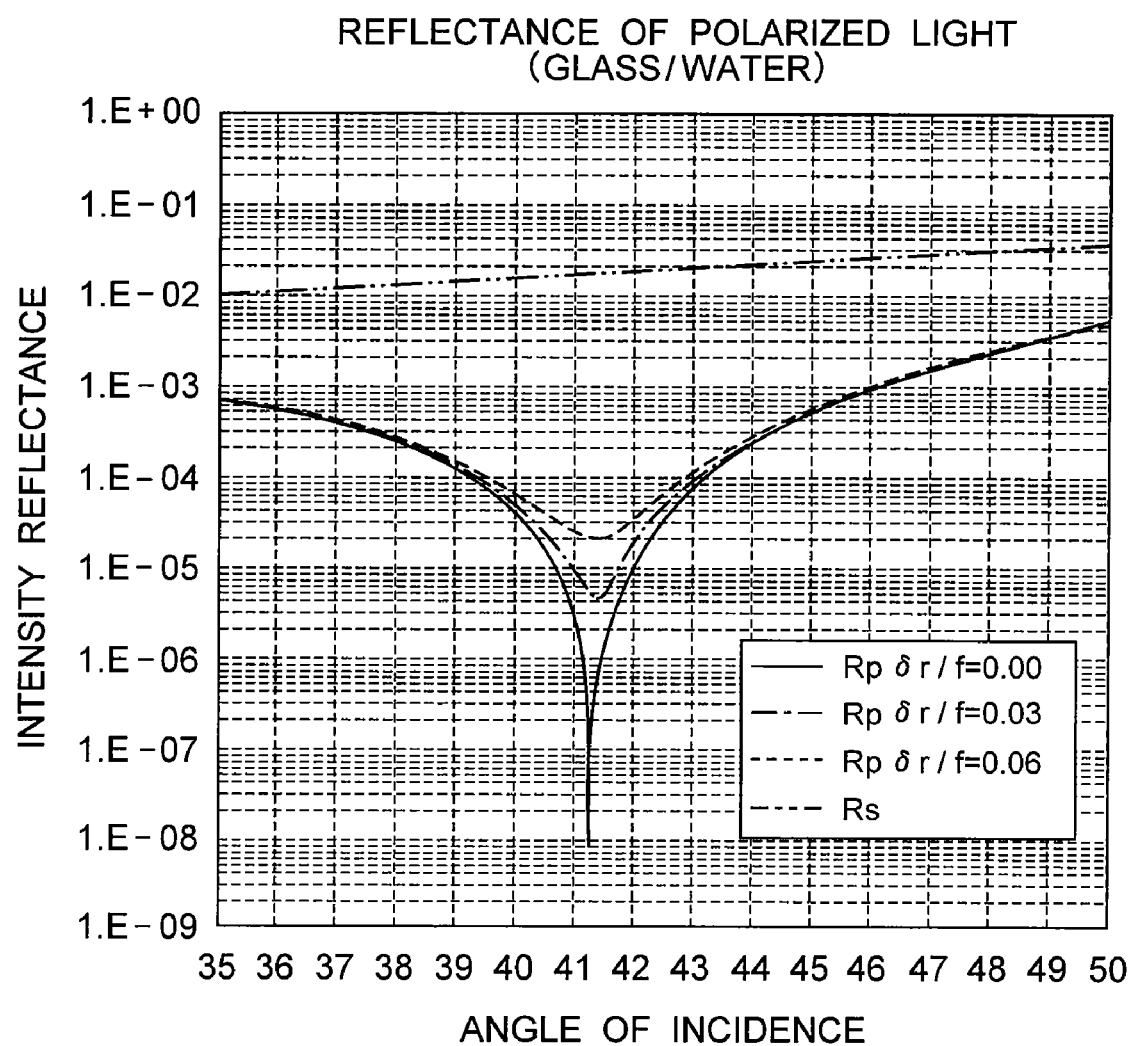
FIG. 16 is a graph showing reflectance of p-polarized light and s-polarized light upon varying the angle of incidence θ of the incident light onto the sample 15 that has the same conditions as that in FIG. 11 according to each embodiment of the present invention.

FIG. 16 is a graph showing reflectance of p-polarized light and s-polarized light upon varying the angle of incidence θ of the incident light onto the sample 15 that has the same conditions as that in FIG. 11. As for p-polarized light, since the steep drop of the reflectance curve in the vicinity of the Brewster angle is drastically reduced by setting the radial width δr of the slit 29 to a finite value as described above, both of the cases δr/f=0.03 and δr/f=0.06 are calculated.

Ax shown in FIG. 16, it is understood that when the radial width δr of the slit 29 is satisfied δr/f=0.03 and δr/f=0.06, intensity reflectance of p-polarized light at the Brewster angle θB (=41.3 degrees) is about $10^{-5}$ to $10^{-4}$, and that of s-polarized light is about $10^{-2}$.

Accordingly, it is understood that intensity of p-polarized light is at least 100 times stronger than that of s-polarized light in the illumination light incident on the sample 15 with the Brewster angle θB in order that intensity reflectance of s-polarized light does not exceed that of p-polarized light.

As shown in FIG. 15, the central angle φ (an angle of the arc) of the slit 29 is about 20 degrees where intensity ratio between p-polarized light and s-polarized light becomes 100, so that the value becomes the upper limit of the central angle φ as shown in following conditional expression (2):

$$0<\phi\leq 20° \qquad (2)$$

where φ denotes a central angle of the slit 29.

It is more preferably that the following conditional expression (2') is satisfied, so that contrast of the observation image can be increased:

$$0<\phi\leq 10° \qquad (2')$$

where φ denotes a central angle of the slit 29.

By using a slit 29 satisfying conditional expression (1) or (1'), and conditional expression (2) or (2'), it becomes possible to obtain excellent observation image upon carrying out not only a Brewster observation, but also a surface plasmon observation and a total reflection fluorescence observation.

As described above, the slit 29 installed in the aperture stop unit 20 of the inverted microscope 1 according to the present embodiment is designed to satisfy the above-described designing condition (conditional expressions (1) and (2)). Accordingly, the inverted microscope 1 according to the present embodiment makes it possible to obtain a high contrast, excellent observation image with suppressing generation of interference fringe upon carrying out a Brewster observation, a surface plasmon observation, and a total reflection fluorescence observation. Designing the slit 29 to satisfy conditional expressions (1') and (2') makes it possible to obtain a high contrast observation image with excellently suppressing generation of interference fringe upon carrying out the above-described each observation.

As shown in FIG. 10B, the slit 29 installed in the aperture stop unit 20 of the inverted microscope 1 according to the present embodiment disposes a plurality of arc shape slits that satisfy the above-described conditional expressions (1) and (2), locating at the same distance from the optical axis AX. Each of the slits has a polarizer whose direction of polarization may be parallel (p-polarization) to a line connecting the center of the slit and the optical axis AX. In this case, although the position of the polarizer may be disposed right before or right after the slit, the position of the polarizer is preferably disposed in the close vicinity of the slit in order to convert light passing through each silt into a right polarization direction.

In such configuration, by means of moving each slit as a module in a direction to change illumination direction, it becomes possible to observe a sample having various refractive indices with a Brewster observation, a surface plasmon observation, and a total reflection fluorescence observation. In this case, since an error caused by a curvature of each slit with an arc shape becomes large, the sum of central angle φ of each slit is preferably within 25 degrees because the plurality of slits as a whole approximately satisfy conditional expression (1').

In the case of moving each slit as a module in a direction as described above, since the sum of central angle φ of each slit is imposed the restriction, it may be possible that a plurality of slits are made to be respective modules to be moved in a radial direction. From the point of view of operability in particular, it is preferable that a plurality of slits can be moved with linked with each other.

In addition to this, it is possible to construct such that a plurality of slit plates each having a slit with a different radius R of arc are provided, and the slit plates are changed as a turret or a slide in accordance with an observation condition. In this case, the slits can be set such that the sum of the central angle φ becomes 360 degrees.

In the inverted microscope 1 according to the present embodiment, by rotating the slit 29 of the aperture stop unit 20 and the polarizer 30 at a high speed around the optical axis AX, the restriction of the central angle φ of the slit generated in the above-described configuration of moving the slits in a radial direction can be dissolved.

In particular, a single or a plurality of slits whose radial direction δr satisfies conditional expression (1) or (1') is rotated at a high speed by a rotation mechanism such as a motor, so that upon observing from the sample side, the sample can be observed in the same state where the aperture is formed over entire circumference of a circle. In this case, since the rotation speed of the slit is necessary to be the same as that of the polarizer, it is preferable that the slit and the polarizer are rotated with synchronizing with each other, or the slit and the polarizer are rotated as a module.

As described above, in the inverted microscope 1 according to the present embodiment, although an arc shaped slit is shown as a minute aperture installed in the aperture stop unit 20, the shape of the minute aperture is not limited to this, it is possible to be a rectangle, or an oval, so far as it is included in a arc shape satisfying conditional expressions (1) and (2).

Moreover, in the inverted microscope 1 according to the present embodiment, it is possible to use the present inverted microscope 1 as a multiple interference microscope using s-polarized light by rotating the direction of the polarizer 30 by 90 degrees or by changing the polarizer 30 in order to make the illumination light be s-polarized light. Otherwise, by rotating the direction of polarization of the polarizer 30 by 45 degrees to set intermediate setting between p-polarized light and s-polarized light, it becomes possible to construct an observation that an observation image of a Brewster observation, or a surface plasmon observation is superimposed by a multiple interference observation. When the slit 29 is composed of a plurality of arc shaped slits as shown in FIG. 10B, the polarizer plates placed on respective slit positions are rotated such that each polarization direction becomes perpendicular (s-polarized light) or 45 degrees to a line connecting substantially the center of the slit and the optical axis AX. When the polarizer is made to be a single unit capable of being exchanged, even if the slit 29 is composed of a plurality of arc shaped slits, an observation with p-polarization, s-polarization, and an intermediate setting can be obtained by exchanging the unit.

Furthermore, in the inverted microscope 1 according to the present embodiment, by disposing a rotating diffuser on the episcopic illumination device 5, interference fringe can further be reduced. In this case, illumination light after passing through the rotating diffuser is preferably converted into linearly polarized light by the polarizer 30. In particular, in order to suppress angular deviation of illumination light incident on the sample 15 with an angle of incidence θ, the rotating diffuser is preferably disposed in front of the slit 29 (to the mercury lamp 16 side in the vicinity of the aperture stop unit 20). On the other hand, when reduction of interference fringe has priority over angular deviation, it is preferable that the rotating diffuser is disposed behind the slit 29 (to the polarizer 30 side in the vicinity of the aperture stop 20).

Moreover, in the inverted microscope 1 according to the present embodiment, the similar effect as the above-described rotating diffuser can be realized by configuring such that illumination light coming out from the mercury lamp 16 passes through a multi-bundle fiber that a plurality of optical fibers having different optical path length are tied up in a bundle.

As described above, the present embodiment makes it possible to realize a microscope which illuminates a sample with a large angle of incidence and suppresses generation of interference fringe excellently.

What is claimed is:

1. A microscope that illuminates a sample with light from a light source through an objective lens and makes it possible to observe the sample through the objective lens, the microscope comprising:
   a minute, arc-shaped aperture that is disposed in an optical path between the light source and the objective lens in the vicinity of an image side focal plane of the objective lens or a conjugate plane thereof, and makes the light from the light source incident on the sample with substantially Brewster angle; and
   a polarizer that is disposed in the optical path between the light source and the objective lens and provides linearly polarized light from light from the light source,
   wherein the minute, arc-shaped aperture satisfies the following conditional expressions:

$\delta r \leq 0.06 \times f$ $\phi \leq 20°$ where $\delta r$ denotes a radial width of the minute, arc-shaped aperture, f denotes a focal length of the objective lens, and $\phi$ denotes a central angle of the minute, arc-shaped aperture.

2. The microscope according to claim 1, further comprising:
   an aperture stop for an episcopic illumination, having a larger aperture than the minute, arc-shaped aperture; and
   a switching member that switches from the minute, arc-shaped aperture to the aperture stop to be disposed into the optical path.

3. The microscope according to claim 1, wherein a rotating diffuser is disposed in the optical path between the light source and the objective lens.

4. The microscope according to claim 1, wherein the minute, arc-shaped aperture and the polarizer are rotatably disposed around the optical axis at high speed.

5. A microscope that illuminates a sample with light from a light source through an objective lens and makes it possible to observe the sample through the objective lens, the microscope comprising:
   a plurality of minute, arc-shaped apertures disposed along a circle centered on the optical axis; and
   a plurality of polarizers disposed corresponding to the plurality of the the minute, arc-shaped apertures respectively;
   wherein each of the minute, arc-shaped apertures satisfies the following conditional expressions:

$\delta r \leq 0.06 \times f$ $\phi \leq 20°$ where $\delta r$ denotes a radial width of the minute, arc-shaped aperture, f denotes a focal length of the objective lens, and $\phi$ denotes a central angle of the minute, arc-shaped aperture; and
   each polarizer is parallel, perpendicular, or 45degrees with respect to a line connecting substantially the center of each corresponding minute aperture and the optical axis.

6. The microscope according to claim 5, wherein each of the plurality of minute, arc-shaped apertures is independently movable in a radial direction thereof.

7. The microscope according to claim 5, wherein, the plurality of minute, arc-shaped apertures and the polarizers are rotatably disposed around the optical axis at high speed.

8. The microscope according to claim 5, wherein a rotating diffuser is disposed in the optical path between the light source and the objective lens.

* * * * *